US009361736B1

(12) United States Patent
Costantino

(10) Patent No.: US 9,361,736 B1
(45) Date of Patent: Jun. 7, 2016

(54) DYNAMIC PRESENTATION OF VEHICULAR-REFERENCE INFORMATION

(75) Inventor: David Costantino, San Diego, CA (US)

(73) Assignee: Mitchell Repair Information Company, LLC, Poway, CA (US)

( * ) Notice: Subject to any disclaimer, the term of this patent is extended or adjusted under 35 U.S.C. 154(b) by 54 days.

(21) Appl. No.: 13/338,515

(22) Filed: Dec. 28, 2011

(51) Int. Cl.
*G01M 17/00* (2006.01)
*G07C 5/00* (2006.01)

(52) U.S. Cl.
CPC .................................... *G07C 5/008* (2013.01)

(58) Field of Classification Search
None
See application file for complete search history.

(56) References Cited

U.S. PATENT DOCUMENTS 6,711,474 B1 * 3/2004 Treyz et al. ...................... 701/1
6,754,564 B2 * 6/2004 Newport .......................... 701/1
7,113,853 B2 * 9/2006 Hecklinger ................. 701/29.6
7,356,393 B1 * 4/2008 Schlatre et al. ............. 701/29.3
7,693,896 B1 * 4/2010 Raines ......................... 707/706
7,778,841 B1 * 8/2010 Bayer et al. .................. 705/306
2004/0059613 A1 * 3/2004 Ford et al. ......................... 705/8
2006/0200285 A1 * 9/2006 Obradovich .................... 701/30
2008/0120570 A1 * 5/2008 Adams et al. ................. 715/804
2010/0191621 A1 * 7/2010 Hogan et al. .................... 705/28
2011/0225096 A1 * 9/2011 Cho et al. ...................... 705/305

* cited by examiner

*Primary Examiner* — Thomas Tarcza
*Assistant Examiner* — Garrett Evans
(74) *Attorney, Agent, or Firm* — McDonnell Boehnen Hulbert & Berghoff LLP

(57) ABSTRACT

A method, system, and apparatus for dynamically presenting desired vehicular-reference information for a motor vehicle under evaluation is provided. In one aspect, an example method includes: (a) a computing system receiving, via a user interface, (i) vehicular-reference data indicating at least one vehicle parameter, and (ii) first information-presentation data indicating at least one information-presentation preference; (b) the computing system selecting at least one first piece of vehicular-reference information based on at least one of the received vehicular-reference data and the received first information-presentation data; (c) the computing system selecting a presentation window based on at least one of the received vehicular-reference data and the received first information-presentation data; and (d) the computing system causing a visual depiction of (i) the selected vehicular-reference information and (ii) the selected presentation window to be displayed on a graphical display.

26 Claims, 21 Drawing Sheets

FIG. 8
700
800
802
702
SELECT MODULE
HOME
MAINTENANCE
CODES
REPAIR
SERVICE MANUAL
VINTAGE
COMMUNITY
ESTIMATOR
Select Vehicle
Chevrolet
Model
History
Feedback
Logout
PRODEMAND
FASTER
ProDemand eliminates the need for multiple information look-ups. By returning relevant content in one look-up, ProDemand quickly gives the technicians everything they need to complete the job.
TSBs to specifications to wiring diagrams and more. ProDemand brings the information to the technicians so they can focus on the vehicle.
phrases, and codes in the database. Technicians don't have to know the OEM specific term because ProDemand will find the information regardless of term entered.
APV
Astro
Avalanche
Aveo
Beretta
Blazer
C3500 HD
Cab & Chassis
Cab & Chassis Silverado
Camaro
Caprice
Cavalier
Celebrity
Chevette
Chevy Express
Chevy Van
Citation
Citation II
Classic
Cobalt
Colorado
Corsica
Corvette
Cruze
Cutaway
El Camino
Epica
Equinox
Forward Control
HHR
Hi-Cube
Impala
Lumina
Lumina APV
Malibu
Malibu Classic
Metro
Monte Carlo
Nova
Optra
Optra5
Pickup
Prizm
RV Cutaway
S10 Blazer
S10 Pickup
Silverado
Silverado Classic
Spectrum
Sportvan
Sprint
SSR
Step Van
Suburban
Tahoe
Tracker
TrailBlazer
Traverse
Uplander
Venture
Volt
Setup
Help

DYNAMIC PRESENTATION OF VEHICULAR-REFERENCE INFORMATION

FIELD OF INVENTION

This application involves, without limitation, maintenance, diagnostic, and repair methods and systems for motor vehicles. More particularly, the application involves an automated process for dynamically presenting desired vehicular-reference information for a motor vehicle that is under evaluation. While the application is described in the context of vehicle evaluation methods and systems, the principles of the application may be equally applicable to any evaluation system, including evaluation systems for non-motor-vehicle equipment.

COPYRIGHT NOTICE

Contained herein is material that is subject to copyright protection. The copyright owner has no objection to the reproduction of the patent disclosure by any person as it appears in the Patent and Trademark Office patent files or records, but otherwise reserves all rights to the copyright whatsoever.

BACKGROUND

Unless otherwise indicated herein, the materials described in this section are not prior art to the claims in this application and are not admitted to be prior art by inclusion in this section. In a typical modern motor vehicle, the operation of the combustion engine is controlled by an engine control module (ECM) which receives a variety of input signals and outputs signals for monitoring and controlling various components of the engine. For example, the ECM can send signals to a fuel system for controlling the air/fuel mix sent to the engine cylinders. The ECM may also receive and store signals from various sensors throughout the engine and drive train. For example, the sensors may provide signals indicative of engine speed, fuel/air mix, intake and exhaust pressure, engine operating temperatures, fluid levels, and the like.

The ECM may retain a portion of this data in memory, providing a history of engine performance, operating parameters, and error indicators. An external interface to the ECM and its stored data is provided at a location accessible to a repair technician. The information stored in the ECM can be downloaded via the external interface at predetermined intervals in the engine life, when there are noticeable degradations in engine performance, or when critical trouble codes are received and externally indicated to an operator of the motor vehicle. The downloaded information can then be analyzed by a repair technician to evaluate the engine performance or error conditions, and thereby make informed recommendations for servicing of the engine.

Once the trouble codes are retrieved, the codes can be entered into a diagnostic tool that utilizes the trouble code information to form diagnostic trees, which are created by Original Equipment Manufacturers (OEMs). Diagnostic tools may allow a repair technician to enter information, including fault symptoms, into the diagnostic tool to be used in conjunction with the information downloaded from the vehicle's on-board computer to diagnose and assist in the repair of fault conditions in the vehicle.

While the use of ECMs and DTCs is prevalent, their use is limited in applicability to those instances where a DTC has actually been received from an ECM. Further, while the retrieval of vehicular information based on DTCs may be somewhat efficient, diagnostic tools generally do not allow a user to otherwise conveniently control the presentation, format, or navigation of other information available regarding the vehicle.

Manufacturers publish repair manuals, including diagnostic trees, exploded part diagrams, and the like, to aid in the diagnosis and repair of problems discovered by such diagnostic tools. For example, based upon selected faults, a diagnostic tree could present the reader with a list of tests to be performed to diagnose the cause or causes of the faults. The tests can be listed in the order in which they would most likely be effective in diagnosing the vehicle faults, based upon a manufacturer's information and previous repair and diagnosis experience with this type of vehicle, for example. The repair manuals may be available in hard copy or accessible via the Internet in a computer viewable format.

In practice, a repair technician then sorts through the repair information in order to find the information pertinent to the specific equipment being diagnosed. Though technicians see this as part of their job, it can be a time consuming process. The time element increases a cost of repair and delays the turn-around time for returning the motor vehicle under repair to service. This is especially important in the trucking industry, where a truck must be on the road to be generating income, or where a disabled truck is carrying a time-sensitive load such as perishable food.

Thus, prevalent methods for obtaining vehicular information are often limited in scope (e.g., diagnostic tools based on DTCs) or somewhat burdensome (e.g., use of manufacturer manuals). An improvement is therefore desired.

SUMMARY

In light of the above, a method, system, and apparatus for dynamically presenting desired vehicular-reference information for a motor vehicle that is under evaluation is provided. In one aspect, an example method includes: (a) a computing system receiving, via a user interface, (i) vehicular-reference data indicating at least one vehicle parameter, and (ii) first information-presentation data indicating at least one information-presentation preference; (b) the computing system selecting at least one first piece of vehicular-reference information based on at least one of the received vehicular-reference data and the received first information-presentation data; (c) the computing system selecting a presentation window based on at least one of the received vehicular-reference data and the received first information-presentation data; and (d) the computing system causing a visual depiction of (i) the selected vehicular-reference information and (ii) the selected presentation window to be displayed on a graphical display.

In another aspect, an example non-transitory computer readable medium includes instructions that when executed by a processor cause a computing system to carry out functions including: (a) receiving, via a user interface, (i) vehicular-reference data indicating at least one vehicle parameter, and (ii) first information-presentation data indicating at least one information-presentation preference; (b) selecting at least one first piece of vehicular-reference information based on at least one of the received vehicular-reference data and the received first information-presentation data; (c) selecting a presentation window based on at least one of the received vehicular-reference data and the received first information-presentation data; and (d) causing a visual depiction of (i) the selected vehicular-reference information and (ii) the selected presentation window to be displayed on a graphical display.

In still another aspect, an example system includes a user interface, a graphical display, a processor, and non-transitory data storage comprising program instructions executable by the processor for causing the computing system to carry out functions including: (a) receiving, via the user interface, (i) vehicular-reference data indicating at least one vehicle parameter, and (ii) first information-presentation data indicating at least one information-presentation preference; (b) selecting at least one first piece of vehicular-reference information based on at least one of the received vehicular-reference data and the received first information-presentation data; (c) selecting a presentation window based on at least one of the received vehicular-reference data and the received first information-presentation data; and (d) causing a visual depiction of (i) the selected vehicular-reference information and (ii) the selected presentation window to be displayed on a graphical display.

In an example embodiment, the vehicle parameter may be at least one of (a) a vehicle make, (b) a vehicle model, (c) a vehicle year, (d) a vehicle engine, (e) a vehicle mileage, (f) a vehicle component, (g) a vehicle identification number (VIN), (h) a vehicle unit number, (i) a vehicle error code, and (j) a vehicle symptom. In short, the vehicle parameter may be any piece, or combination, of information that may be used to identify vehicular-reference information that the user would benefit from accessing. Further, the information-presentation preference may be one of (a) maintenance information, (b) repair information, (c) diagnostic information, or (d) collision information. In short, the information-presentation preference may be used to further refine the identification of the vehicular-reference information the user would benefit from accessing, as well as to identify the format in which the vehicular-reference information is presented to the user. Thus, as a result of providing the vehicle parameter and the information-presentation preference, the user may efficiently and conveniently retrieve, and ultimately access, specific types of information in a desired form.

These as well as other features, advantages and alternatives will become apparent to those of ordinary skill in the art by reading the following detailed description, with appropriate reference to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and designed in a wide variety of different configurations, all of which are contemplated herein.

I. EXAMPLE SYSTEM AND DEVICE ARCHITECTURE

Figure 1:
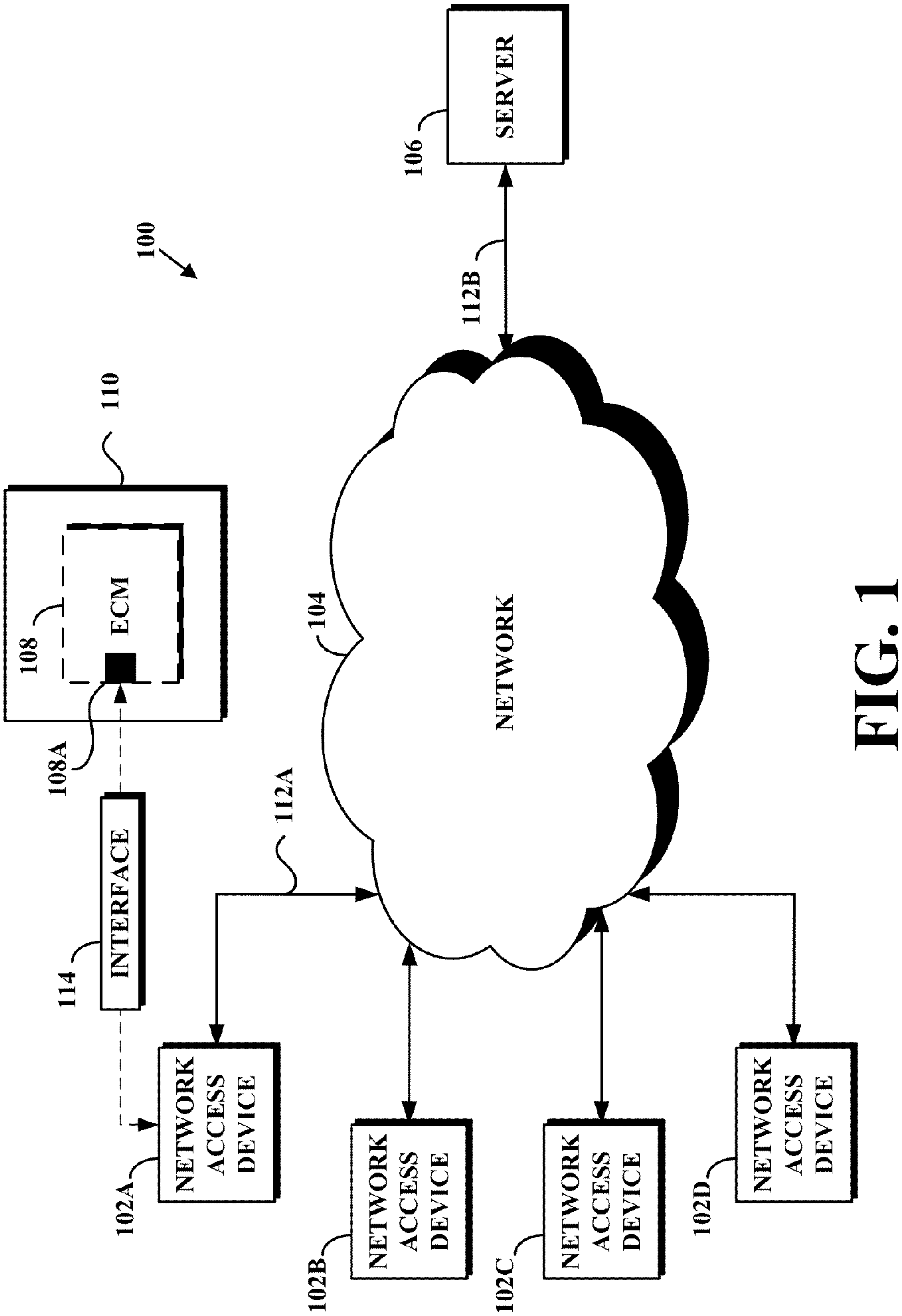
FIG. 1 is a simplified block diagram of an example communication network over which at least one embodiment can be implemented.

FIG. 1 is a simplified block diagram of an example communication network over which at least one embodiment can be implemented. It should be understood that this and other arrangements described herein are set forth only as examples. Those skilled in the art will appreciate that other arrangements and elements (e.g., machines, interfaces, functions, orders and groupings of functions, etc.) can be used instead, and that some elements may be omitted. Further, many elements described herein are functional entities that may be implemented as discrete or distributed components or in conjunction with other components, and in any suitable combination and location. Various functions described herein as being performed by one or more entities may be carried out by hardware, firmware, and/or software—various functions described herein may be carried out by one or more processors executing instructions stored in memory.

As shown in FIG. 1, communications network 100 includes various network-access devices 102A-102D, a network 104 (which may be a public or private network), a server 106, and an optional Engine Control Module (ECM) 108 contained within a vehicle 110. Note that additional entities not depicted in FIG. 1 could be present as well. As an example, there could be more network-access devices, more ECMs (and associated vehicles), and more servers in communication with network 104. Other network elements may be in communication with network 104 as well. Also, there could be one or more devices and/or networks making up at least part of one or more of the communication links, such as communication links 112A and 112B, depicted in FIG. 1. As an example, there could be one or more routers, switches, and/or other devices or networks on the communication links between network-access devices 102A-102D, network 104, and/or server 106.

As shown, a network access device, such as network-access device 102A, interfaces with ECM 108 via a vehicle interface port 108A and PC-to-vehicle interface 114. Although an ECM is a standardized control module, any type of electronic error reporting and storage device could be used. Motor vehicle 110 may be a passenger car, a light duty truck, a tractor-trailer truck, or any other type of motor vehicle or general electro-mechanical system. Network-access device 102A may communicate with PC-to-vehicle interface 114 through a wired connection or a wireless connection.

PC-to-vehicle interface 114 may be a standard interface well known in the industry for providing standardized access to vehicle ECM modules across a multitude of different protocols. For example, the Nexiq® USB-Link (Product No. 125032) may be used to provide an interface between network access device 102A and ECM 108.

Each of network-access devices 102A-102D may be any network-access device arranged to carry out the network-access device functions described herein. Generally, the network-access device may be any suitable computing device, such as a computer, laptop computer, tablet computer, smartphone, and/or vehicle-diagnostic device, among other examples. The operation of the network-access device may be effected by software or firmware code stored in a non-volatile data store and executed via a general purpose processor transformed by the software or firmware code into a specific purpose processor, or may be effected solely by a hardware structure, or a combination of the two.

Figure 2:
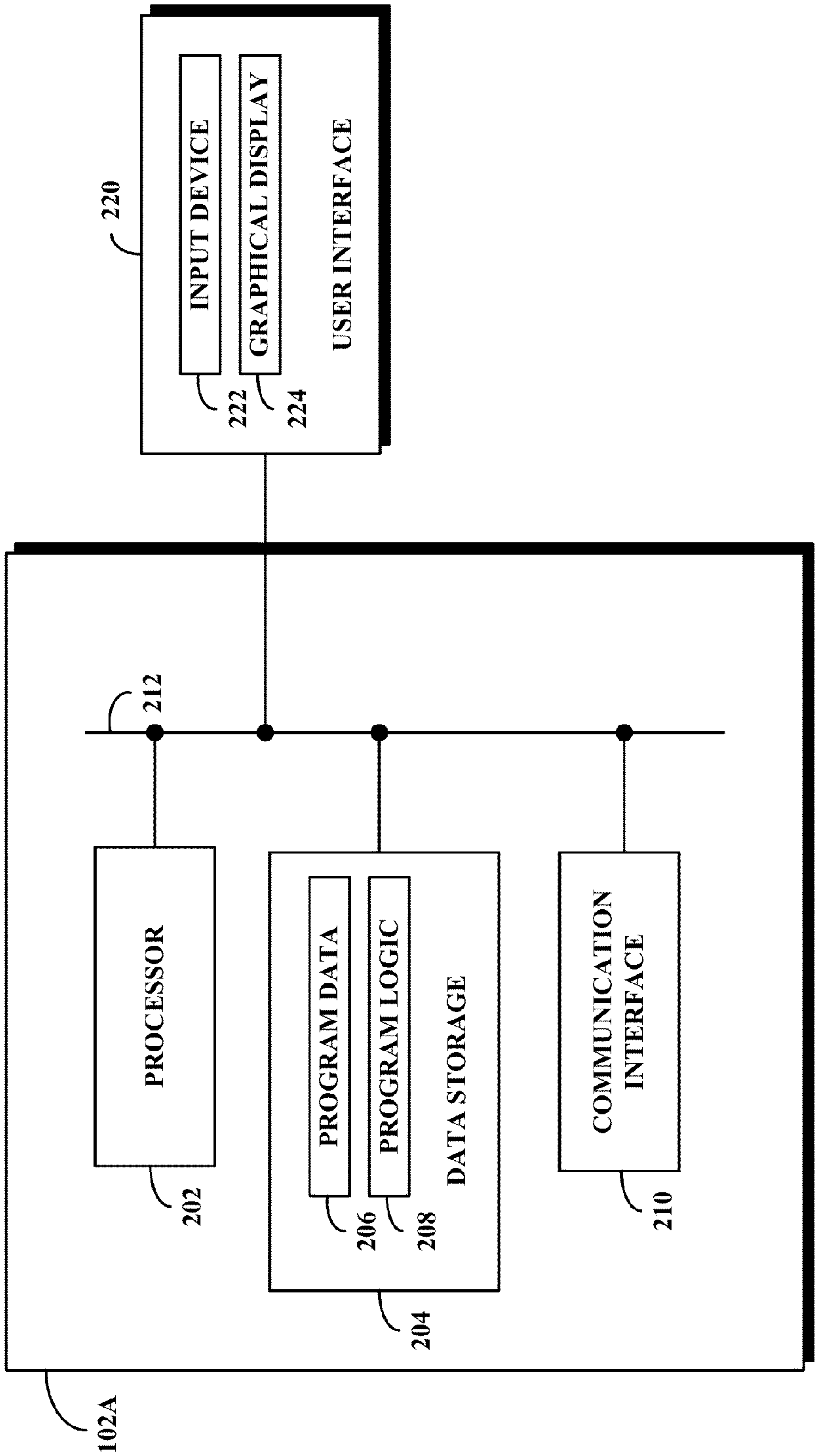
FIG. 2 is a simplified block diagram of an example network-access device.

As such, each of network-access devices 102A-102D, including network-access device 102A as shown in FIG. 2, may include a processor 202, data storage 204, and a communication interface 210, all linked together via a system bus, network, and/or other connection mechanism 212. It is contemplated that embodiments of the disclosure herein may be carried out via a general purpose computing system, perhaps via a user interface that is operated within a web-browser application. However, embodiments may also be carried out on special-purpose computing systems as well. One example of such a special-purpose diagnostic device includes a vehicle analyzer system, such as the engine analyzer system disclosed in U.S. Pat. No. 5,250,935, which is herein incorporated in its entirety by reference, as if fully set forth in this description.

Processor 202 may comprise one or more general-purpose microprocessors and/or one or more dedicated signal processors, and may be integrated in whole or in part with communication interface 210. Data storage 204 may comprise memory and/or other storage components, such as optical, magnetic, organic or other memory disc storage, which can be volatile and/or non-volatile, internal and/or external, and integrated in whole or in part with processor 202. Data storage 204 may be arranged to contain (i) program data 206 and (ii) program logic 208. Although these components are described herein as separate data-storage elements, the elements could just as well be physically integrated together or distributed in various other ways. For example, program data 206 may be maintained in data storage 204 separate from program logic 208, for easy updating and reference by program logic 208.

Communication interface 210 functions to communicatively couple network-access device 102A to packet-data-communication networks such as network 104, and as such may include a wired (e.g., Ethernet) packet-data interface and/or a wireless (e.g., Wi-Fi) packet-data interface for communicating with other devices, entities, and/or networks in accordance with various embodiments. Network-access device 102A may also include multiple interfaces 210, such as one for transmitting data and another for receiving data.

Network-access device 102A may also include, or may be otherwise communicatively coupled to, user interface 220. User interface 220 may include input device 222 comprising, for example, buttons, a touch screen, a microphone, and/or any other elements for receiving inputs. User interface 220 may also include one or more elements for conveying outputs, such as one or more graphical displays 224, one or more speakers, etc. In operation, user interface 220 may be configured to display a graphical user interface (GUI) via graphical display 224 and to receive inputs corresponding to use of such a GUI. For example, network-access device 102A may be configured to receive vehicular-reference data and information-presentation data in accordance with the example methods described herein and discussed further below.

Further, network-access device 102A may interface with ECM 108 to collect information about vehicle 110. More particularly, network-access device 102A may interface with one or more systems within vehicle 110 to obtain information about those systems. For example, network-access device 102A might obtain information about the vehicle's engine, transmission system, electrical systems, air conditioning system, braking system, power steering system or any other system. Network-access device 102A might interface directly with these various systems, or network-access device 102A might interface with other equipment (not shown), which in turn interfaces with various systems or components in vehicle 110. Other configurations are also possible.

Depending on vehicle 110 and, the particular configuration of network-access device 102A or other equipment, network-access device 102A may obtain stored trouble code information, or other information, about the various systems in vehicle 110 automatically upon being connected to vehicle 110 or upon an appropriate prompt to a user (such as a repair technician) utilizing network-access device 102A. An automated process advantageously allows a user to quickly and efficiently obtain information about various systems in vehicle 110.

The user might also manually direct ECM 108, via network-access device 102A, to perform various tests on vehicle 110 or to acquire certain other information about vehicle 110. This might be in addition to or in place of the previously described automated information-collection methods. Thus, network-access device 102A might automatically collect predetermined data, might collect additional data as directed by the user, or might perform a combination of these methods to acquire information.

Once network-access device 102A acquires a user input such as vehicular-reference data and/or information-presentation data, and/or trouble code information from vehicle 110, network-access device 102A may then communicate that information to server 106. Server 106 may be any network server or other computing system arranged to carry out the server functions described herein including, but not limited to, those functions described with respect to FIG. 4. Server 106 may be a mainframe computer, a blade server, a desktop machine, or any other computing system capable of responding to network requests.

Figure 3A:
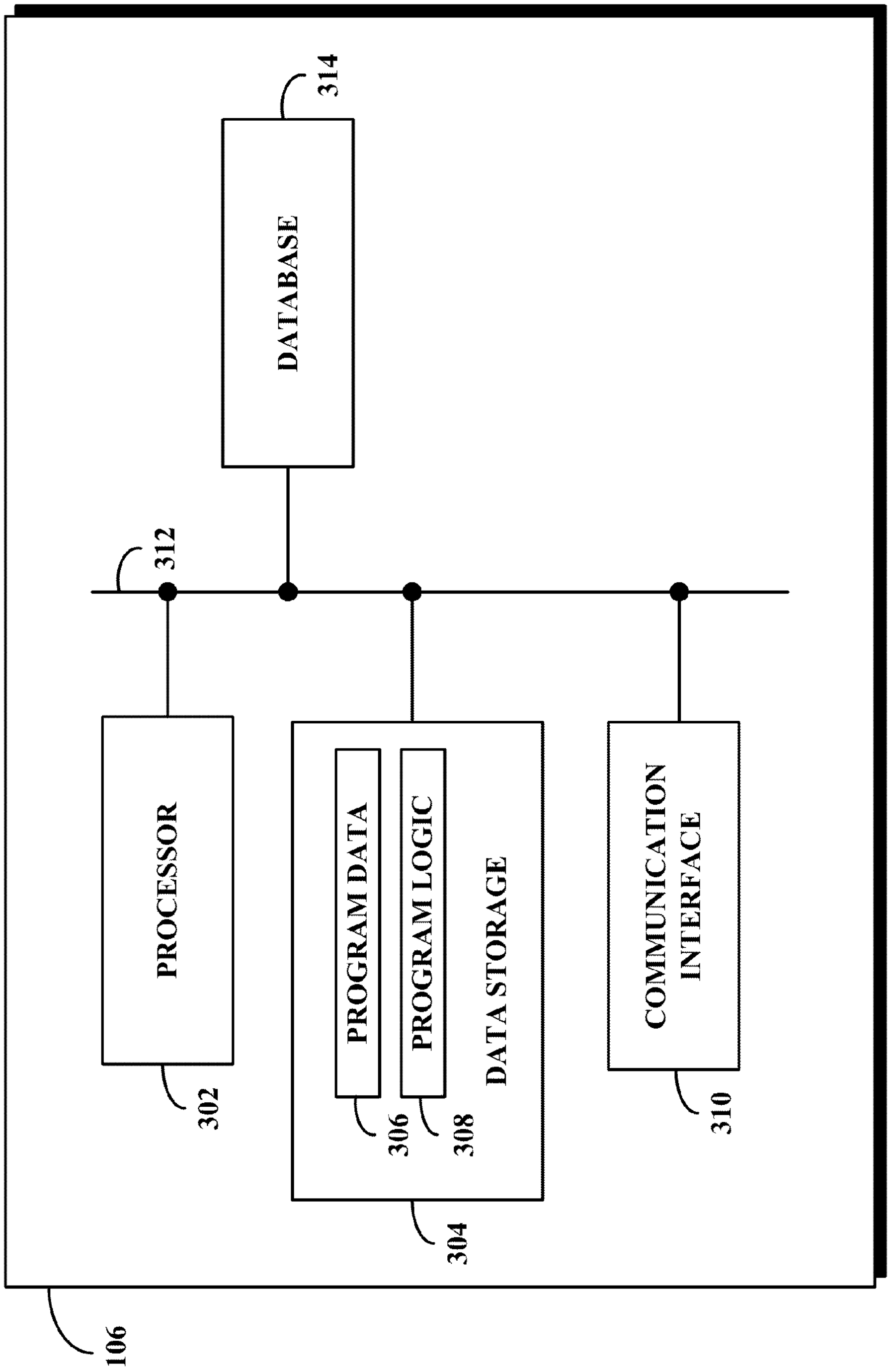
FIG. 3A is a simplified block diagram of an example server.

As such, as shown in FIG. 3A, server 106 may include processor 302, data storage 304 containing program data 306 and program logic 308, and communication interface 310, all linked together via system bus, network, and/or other connection mechanism 312. Processor 302, data storage 304, program data 306, program logic 308, and communication interface 310 may be configured and/or arranged similar to processor 202, data storage 204, program data 206, program logic 208, and communication interface 210, respectively, as described above with respect to network-access device 102A.

Data storage 304 may contain information used by server 106 in operation. For example, date storage 304 may contain instructions executable by processor 302 for carrying out the server functions described herein including, but not limited to, those functions described in connection with FIG. 4. As another example, data storage 304 may contain various design logic and/or design data used for selecting vehicular-reference information and/or presentation windows. Generally, data storage 304 may contain information used by server 106 to provide vehicular-reference information that is accessible by various network-access devices, such as network-access device 102A, over network 104.

Server 106 may also include a permanent data store for storing vehicular-reference information database 314. Database 314 may include tagged text that is searchable and graphic images and set forth maintenance, repair, and diagnostic information usable by a user. While database 314 is shown as stored within server 106, this is not necessary. Database 314 may also be stored remote from server 106, perhaps on another server or other network device that is communicatively coupled to server 106.

Figure 3B:
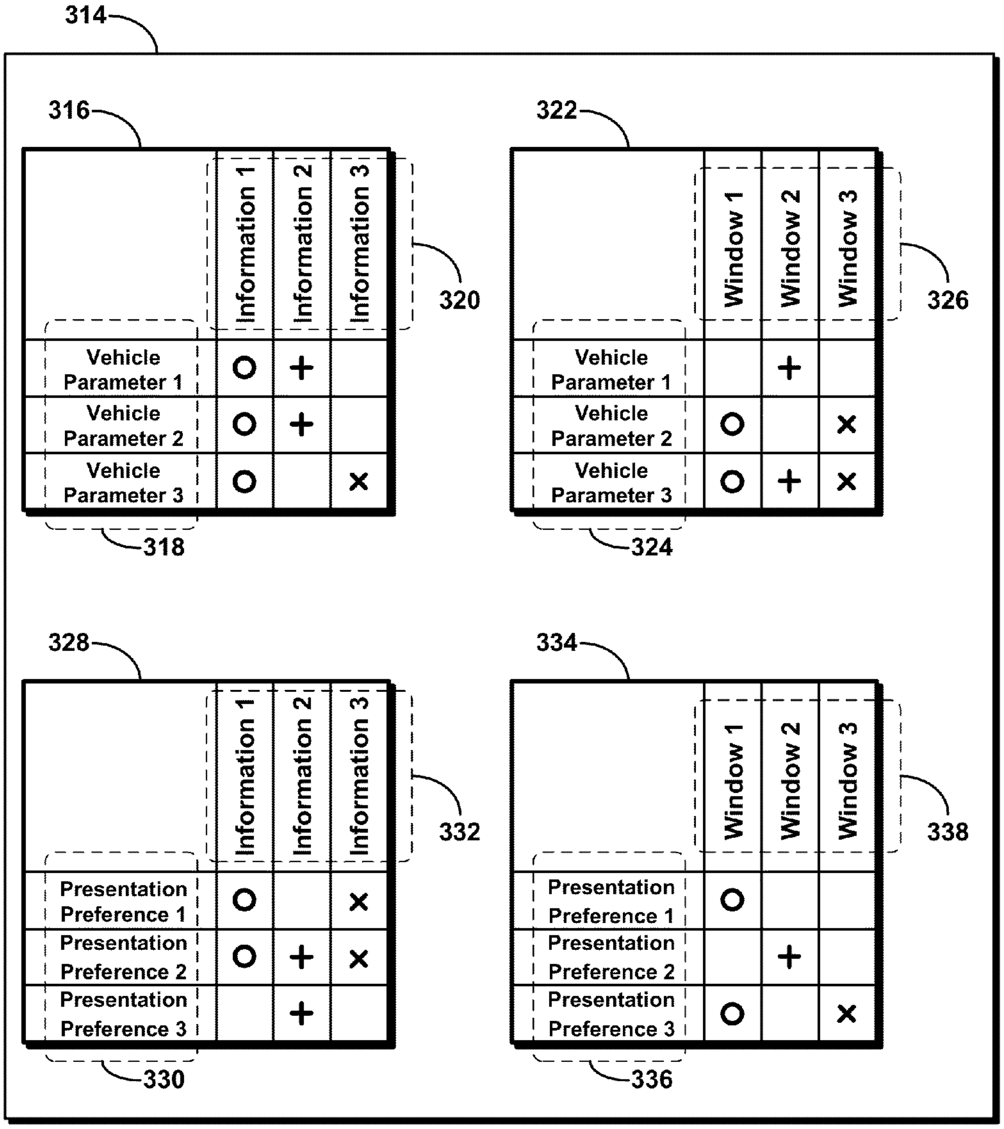
FIG. 3B is a simplified block diagram of an example database.

With reference to FIG. 3B, database 314 may include a number of example data tables 316, 322, 328, and 334. Such data tables may store information regarding relationships among various vehicle parameters, information-presentation preferences, vehicular-reference information, and presentation windows.

With respect to data table 316, various relationships between vehicle parameters 318 and vehicular-reference information 320 are shown. For instance, as indicated by the "+" symbol, each of vehicle parameter 1 and 2 are associated with vehicular-reference information 2. And, as indicated by the "x" symbol, vehicle parameter 3 is associated with vehicular-reference information 3.

With respect to data table 322, various relationships between vehicle parameters 324 and presentation windows 326 are shown. For instance, as indicated by the "○" symbol, each of vehicle parameter 2 and 3 are associated with presentation window 1. And, as indicated by the "+" symbol, each of vehicle parameter 1 and 3 are associated with presentation window 2.

With respect to data table 328, various relationships between information-presentation preferences 330 and vehicular-reference information 332 are shown. For instance, as indicated by the "+" symbol, each of information-presentation preference 2 and 3 are associated with vehicular-reference information 2. And, as indicated by the "x" symbol, each of information-presentation preference 1 and 2 are associated with vehicular-reference information 3.

With respect to data table 334, various relationships between information-presentation preferences 336 and presentation windows 338 are shown. For instance, as indicated by the "o" symbol, each of information-presentation preferences 1 and 3 are associated with presentation window 1. And, as indicated by the "+" symbol, information-presentation preference 2 is associated with presentation window 2.

The various data entries in data tables 316, 322, 328, and 334 may contain any suitable or desired information. For instance, each of the symbols "○," "+," and "x" may represent a particular data entry. Further, each of the symbols may represent additional, associated information as well, such as various tags, labels, type-information, or other metadata related to the data entry.

The data tables shown with respect to database 314 in FIG. 3B are shown for purposes of example and explanation only and should not be taken to be limiting. Other arrangements, configurations, and/or associations of vehicle parameters, information-presentation preferences, vehicular-reference information, and presentation windows may be possible as well. Those of skill in the art will appreciate that database 314, and server 106 more generally, may store information in any suitable and/or desired manner, and that such information may be accessed in any suitable and/or desired manner.

As described further below, server 106 can provide a centralized location for users to obtain possible causes of problems with their motor vehicles, obtain diagrammed testing steps, specifications, and illustrated repair and removal instructions, among other types of vehicular-reference information, including that discussed further below. Server 106 can be located at the user's worksite (perhaps accessed via a local area network) or may be located at a more remote location (perhaps accessed via a wide area network or via the Internet). In either case, server 106 may be accessed simultaneously by more than one user. Thus the server 106 might communicate with multiple network-access devices at the same time.

Accordingly, network 104 may include one or more wide area networks, one or more local area networks, one or more public networks such as the Internet, one or more private networks, one or more wired networks, one or more wireless networks, and/or one or more networks of any other variety. Devices in communication with network 104 (including, but not limited to, network-access devices 102A-102D and server 106) may exchange data via communication links, such as communication links 112A and 112B, using a packet-switched protocol such as IP, and may be identified by an address such as an IP address. Communication links 112A and 112B may be wired links or wireless links, or a combination thereof. A wireless communication link can use a variety of different wireless protocols, such as the protocols under the Institute of Electrical and Electronics Engineers ("IEEE") 802.11 umbrella, IEEE 802.16, IEEE 802.20, Bluetooth, code division multiple access ("CDMA"), frequency division multiple access ("FDMA"), time division multiple access ("TDMA"), Global System for Mobile Communications/General Packet Radio Service ("GSM/GPRS"), infrared, or others. Furthermore, data may be accessible via the Internet using one or more network protocols supported by a TCP network, including but not limited to: HTTP, FTP, or SSH.

II. EXAMPLE METHODS

Figure 4:
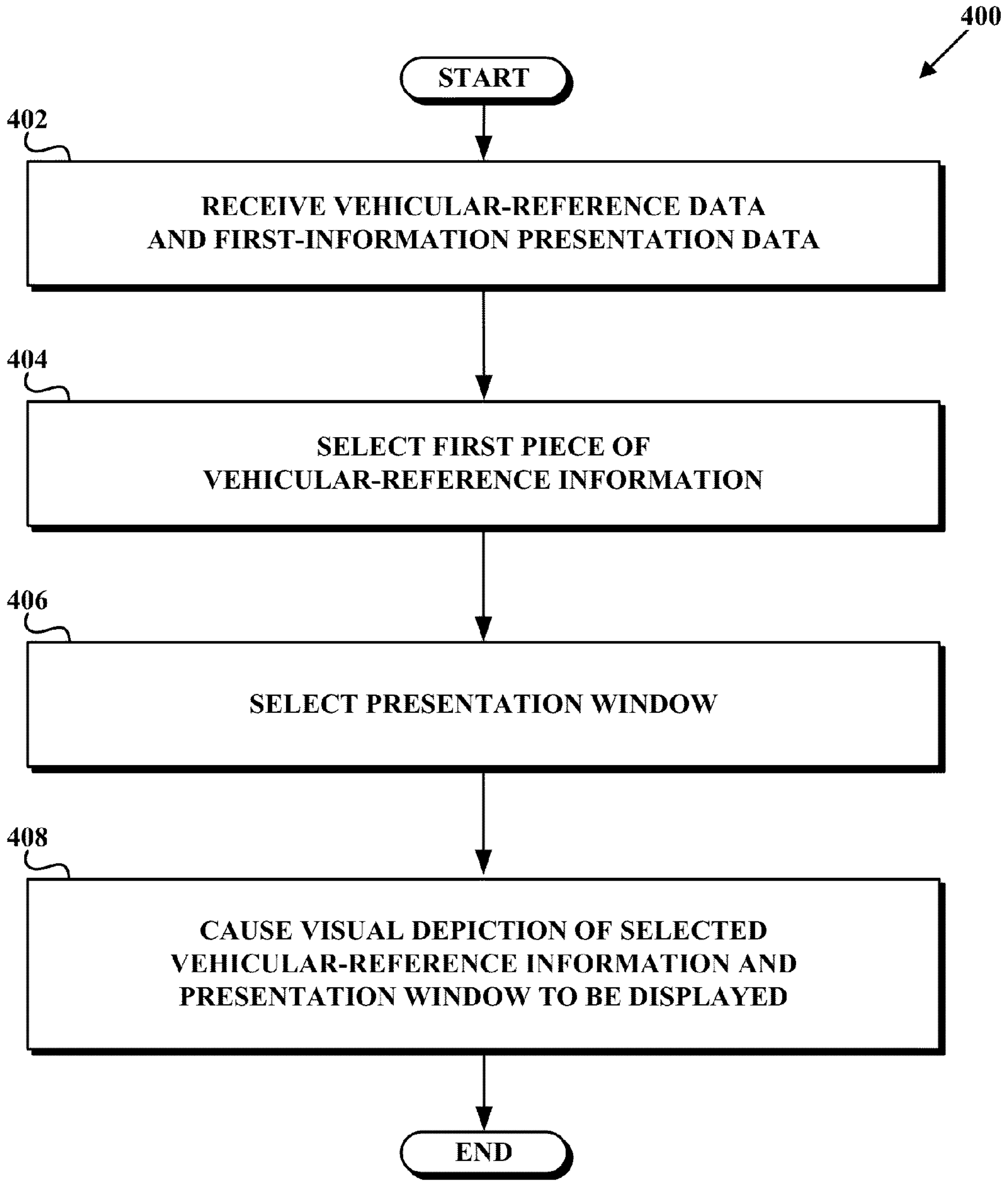
FIG. 4 shows a flowchart depicting an example method for dynamic presentation of vehicular-reference information.
Figure 5A:
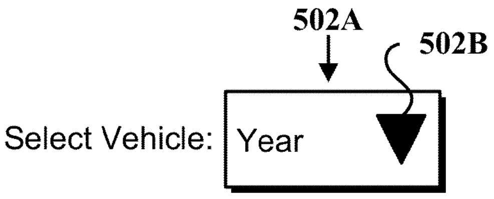
FIGS. 5A-5D show example vehicular-reference data input buttons.
Figure 5B:
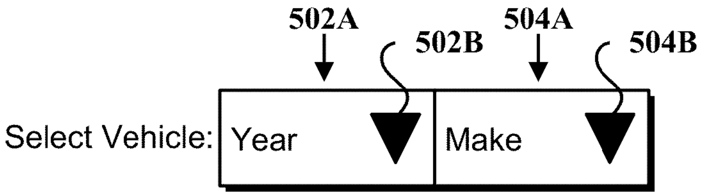
Figure 5C:
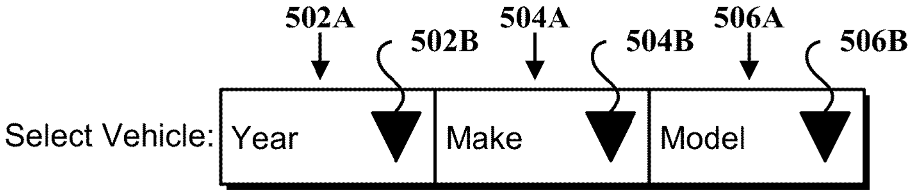
Figure 5D:
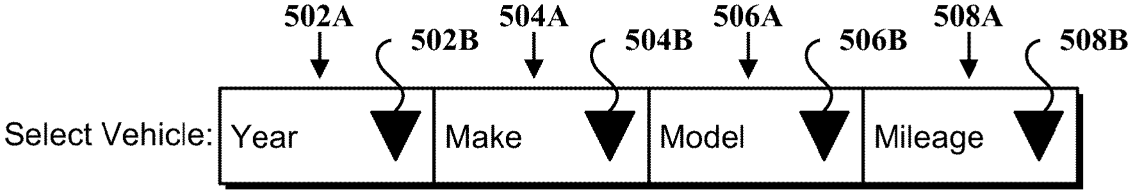

FIG. 4 shows a flowchart depicting an example method for dynamically presenting vehicular-reference information. Method 400 is described, by way of example, as being carried out by a computing system such as, for example, server 106. However, it should be understood that example methods disclosed herein, such as method 400, may be carried out by computing systems other than a server, and/or may be carried out by sub-systems in a server or in other devices. For example, the example method may alternatively be carried out entirely by a network-access device or some other computing system that may or may not be coupled to any network. Other examples are also possible.

Furthermore, those skilled in the art will understand that the flowchart described herein with respect to FIG. 4 illustrates functionality and operation of certain implementations of example embodiments. In this regard, each block of the flowchart may represent a module, a segment, or a portion of program code, which includes one or more instructions executable by a processor (e.g., processor 302 described below with respect to server 106) for implementing specific logical functions or steps in the process. The program code may be stored on any type of computer readable medium (e.g., computer readable storage medium or non-transitory media, such as data storage 304 described above with respect to server 106), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Example method 400 involves, as shown by block 402, a computing system receiving, via a user interface, (i) vehicular-reference data indicating at least one vehicle parameter, and (ii) first information-presentation data indicating at least one information-presentation preference. At block 404, the computing system selects at least one first piece of vehicular-reference information based on at least one of the received vehicular-reference data and the received first information-presentation data. At block 406, the computing system selects a presentation window based on at least one of the received vehicular-reference data and the received first information-presentation data. And at block 408, the computing system causes a visual depiction of (i) the selected vehicular-reference information and (ii) the selected presentation window to be displayed on a graphical display. Each of these blocks is discussed further below.

a. Receive Vehicular-Reference Data and First-Information Presentation Data

At block 402, a computing system receives, via a user interface, (i) vehicular-reference data indicating at least one vehicle parameter, and (ii) first information-presentation data indicating at least one information-presentation preference. As will be discussed further below, the vehicular-reference data and the first information-presentation data may be used by server 106 to select and, ultimately, to display to the user, vehicular-reference information via a presentation window.

The vehicular-reference data and the first information-presentation data may be input by a user in any suitable manner. In an embodiment, server 106 may cause network-access device 102A to display a question, series of questions, a data-entry field, or a selectable button, among other possible examples, that prompt or otherwise allow the user to specify certain vehicle parameters and/or information-presentation preferences. Accordingly, server 106 may store logic arranged to prompt the user in such a manner. The input provided in response to the prompt may by input by the user using input device 222, and the input may be received by server 106 in the form of vehicular-reference data and/or first information-presentation data.

The vehicle parameter indicated by the vehicular-reference data may take on any desired form. Generally, the vehicle parameter may reflect information concerning the type and/or state of a vehicle that is under evaluation. For instance, the vehicle parameter may be at least one of (a) a vehicle make, (b) a vehicle model, (c) a vehicle year, (d) a vehicle engine, (e) a vehicle mileage, (f) a vehicle component, (g) a vehicle identification number (VIN), (h) a vehicle unit number, (i) a vehicle error code, and (j) a vehicle symptom. Other examples of vehicle parameters may exist as well.

As a particular example of receiving vehicular-reference data, therefore, the user may be prompted to indicate one or more of a year, make, model, and mileage of the vehicle under evaluation. For instance, with reference to FIG. 5, the user may be presented with year button 502A, including a drop-down button 502B which, when pressed, displays a variety of years for the user to choose from. Upon selecting a year, the user may then be presented with make button 504A, including a drop-down button 504B which, when pressed, displays a variety of vehicle-makes for the user to choose from. Upon selecting a make, the user may then be presented with model button 506A, including a drop-down button 506B which, when pressed, displays a variety of vehicle-models for the user to choose from. And upon selecting a model, the user may then be presented with mileage button 508A, including a drop-down button 508B which, when pressed, displays a variety of vehicle-models for the user to choose from.

Figure 6:
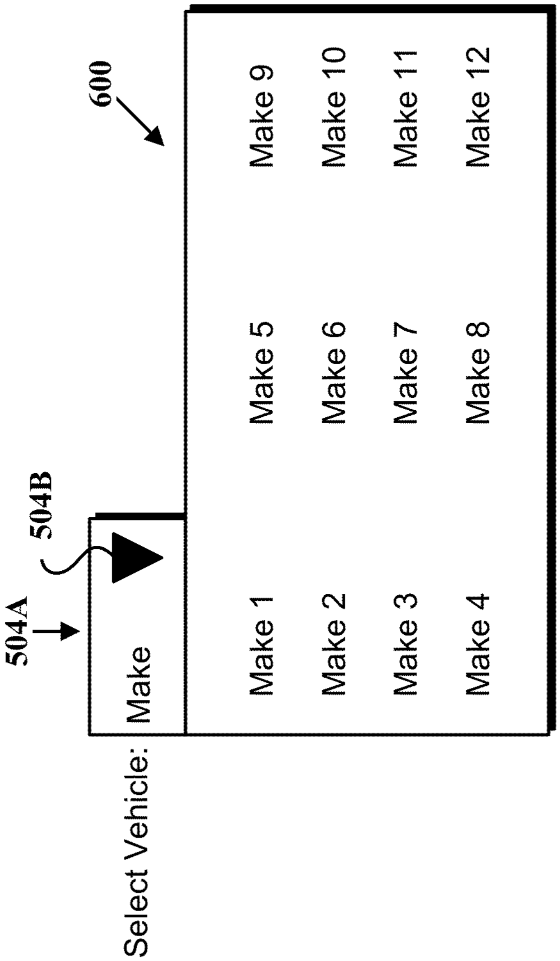
FIG. 6 shows an example vehicle-make button with an example drop-down menu containing a variety of vehicle makes.

For purposes of example and explanation, FIG. 6 shows example make button 504A with example drop-down menu 600 containing a variety of makes 1-12 for the user to choose from. The user may select any of makes 1-12, and thus provide the selected make as a vehicle parameter to server 106 as vehicular-reference data.

Figure 7:
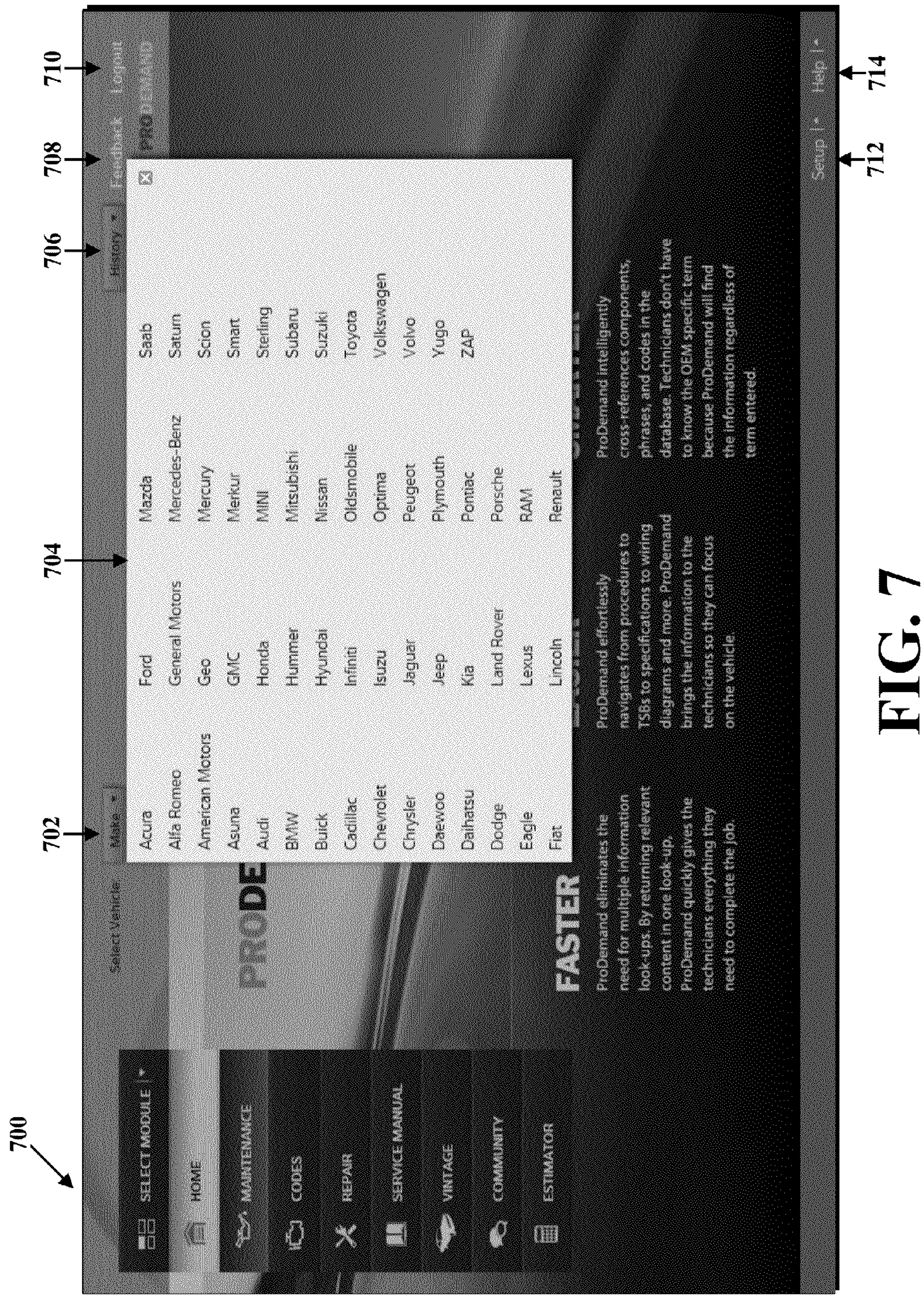
FIG. 7 shows an example graphical user interface capable of receiving user inputs.

For further purposes of example and explanation, FIG. 7 shows an example graphical user interface 700 capable of receiving user inputs. As shown, graphical user interface 700 includes example make button 702 with example drop-down menu 704 containing a variety of vehicle-makes for the user to choose from. The user may select any of the vehicle-makes, and thus provide the selected make as a vehicle parameter to server 106 as vehicular-reference data. It should be understood that the specific embodiment of an example graphical user interface as shown in FIG. 7 is set forth for purposes of example and explanation only, and should not be taken to be limiting.

As shown, graphical user interface 700 includes a number of additional example buttons. History button 706 may be used to access vehicular-reference information that the user has accessed in the past. Feedback button 708 may be used to provide feedback to the computing system designers, engineers, or other support personnel. Logout button 710 may allow the user to exit the computing system. Setup button 712 may allow the user to manipulate various settings such as the graphical user interface layout and/or color scheme, or the users' account information. Help button 714 may provide access to instructions, explanations, or other information concerning use of the computing system. Other additional buttons may be included in graphical user interface 700 as well.

Figure 8:
FIG. 8 shows an example graphical user interface including an example vehicle-make button and an example vehicle-model button with a drop-down menu containing a variety of vehicle models.

FIG. 8 shows example graphical user interface 700 including example make button 702 and example model button 802 with drop-down menu 800 containing a variety of vehicle-models for the user to choose from. The user may select any of the vehicle-models, and thus provide the selected model as a vehicle parameter to server 106 as vehicular-reference data. It should be understood the specific embodiment of an example graphical user interface as shown in FIG. 8 is set forth for purposes of example and explanation only, and should not be taken to be limiting.

Figure 9:
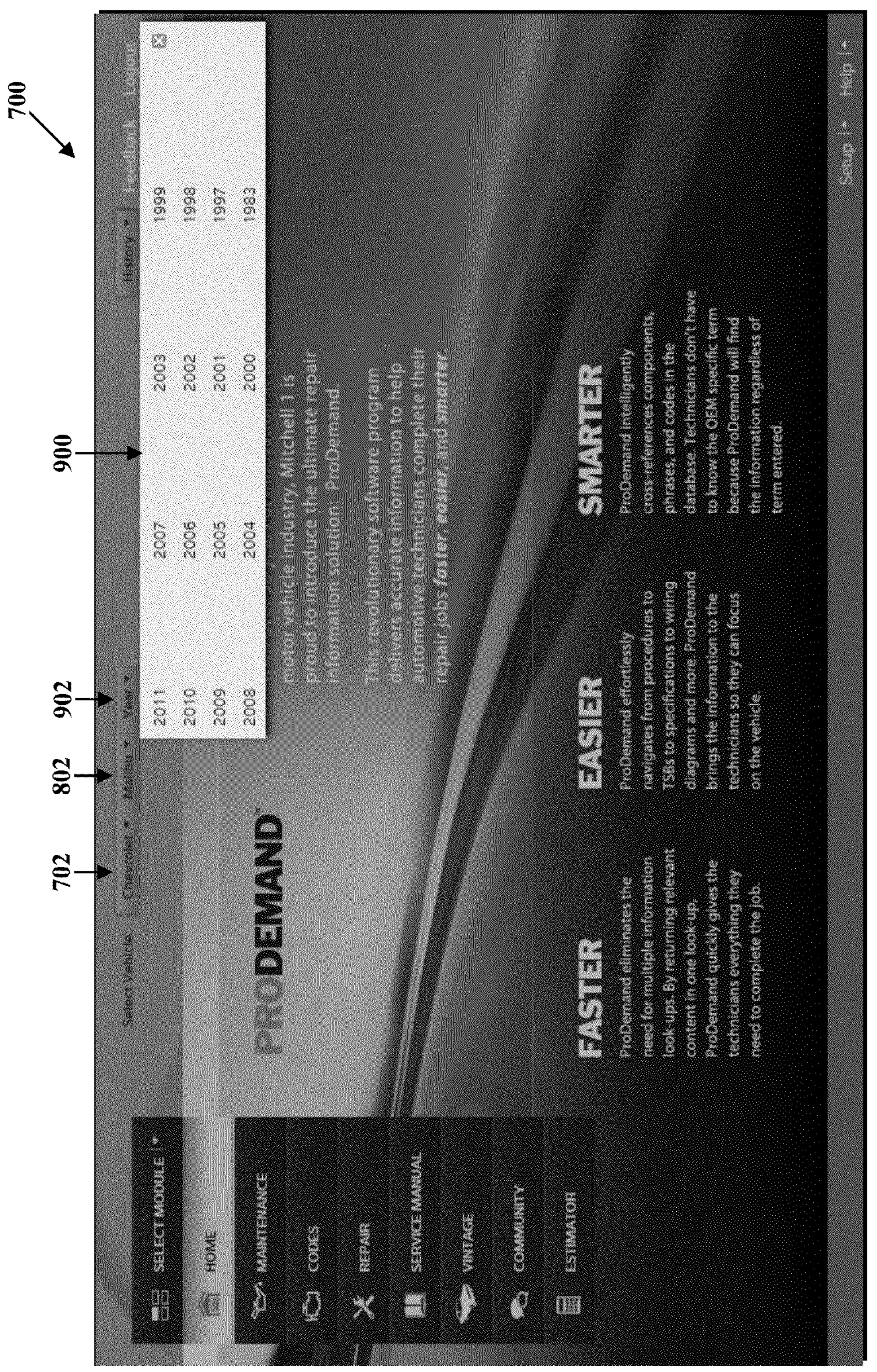
FIG. 9 shows an example graphical user interface including an example vehicle-make button, an example vehicle-model button, and an example year button with a drop-down menu containing a variety of years.

FIG. 9 shows example graphical user interface 700 including example make button 702, example model button 802, and example year button 902 with drop-down menu 900 containing a variety of years for the user to choose from. The user may select any of the years, and thus provide the selected year as a vehicle parameter to server 106 as vehicular-reference data. It should be understood the specific embodiment of an example graphical user interface as shown in FIG. 9 is set forth for purposes of example and explanation only, and should not be taken to be limiting.

Figure 10:
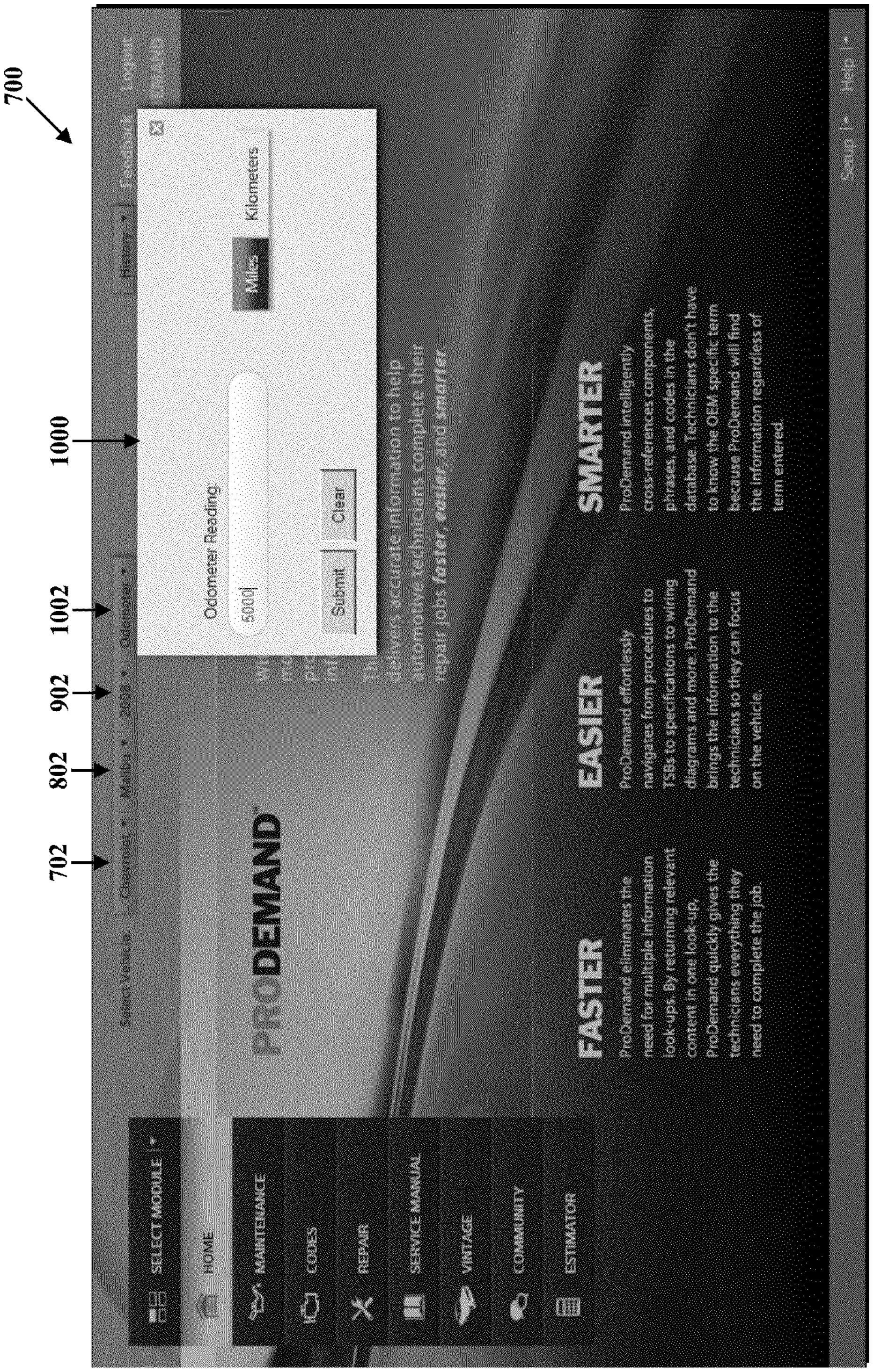
FIG. 10 shows an example graphical user interface including an example vehicle-make button, an example vehicle-model button, an example year button, and example vehicle-mileage button with a drop-down menu containing an odometer-reading input field.

FIG. 10 shows example graphical user interface 700 including example make button 702, example model button 802, example year button 902, and example mileage button 1002 with drop-down menu 1000 containing an odometer-reading input field. The user may input a number of miles (or number of kilometers) into the odometer-reading input field, and thus provide the odometer reading as a vehicle parameter to server 106 as vehicular-reference data. It should be understood the specific embodiment of an example graphical user interface as shown in FIG. 10 is set forth for purposes of example and explanation only, and should not be taken to be limiting.

While vehicle-reference data has thus far been described as being received in association with a user input, it may also be received via an ECM that the network-access node is within communication with. For example, the computing system may receive a vehicle identification number (VIN) from the ECM. As another example, the computing system may receive a vehicle error code from the ECM.

In sum, any vehicle parameter including, but not limited to, any one of (a) a vehicle make, (b) a vehicle model, (c) a vehicle year, (d) a vehicle engine, (e) a vehicle mileage, (f) a vehicle component, (g) a vehicle identification number (VIN), (h) a vehicle unit number, (i) a vehicle error code, and (j) a vehicle symptom, may be received by the computing system as a result of user input or via a communication link to the vehicle itself (e.g., via a communication link with a ECM).

The information-presentation preference indicated by the information-presentation data may take on any desired form. Generally, the information-presentation preference may reflect a type of vehicular-reference information that the user is interested in and/or a desired manner of presentation of such vehicular-reference information. For instance, the information-presentation preference may be one of (a) maintenance information, (b) repair information, (c) diagnostic information, or (d) collision information. Other examples of information-presentation preferences may exist as well.

Figure 11:
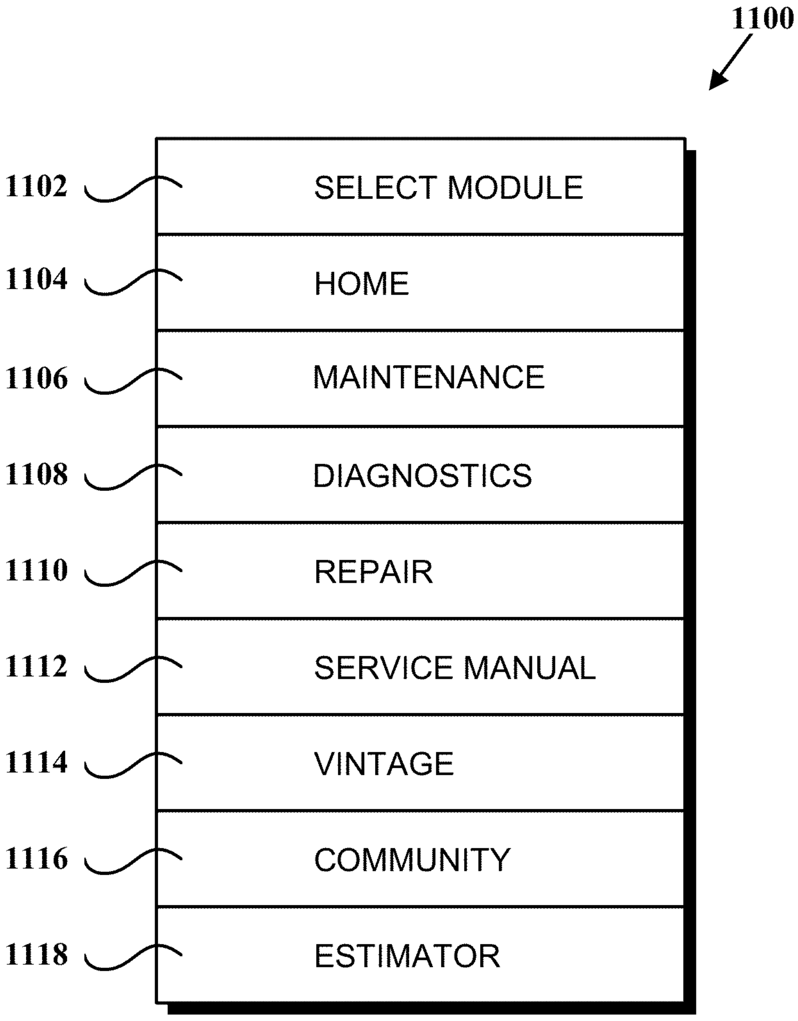
FIG. 11 shows an example menu containing example information-presentation data input buttons.

As an example of receiving information-presentation data, therefore, the user may be prompted to indicate one of a maintenance-information preference, a repair-information preference, a diagnostic-information preference, or a collision-information preference. For instance, with reference to FIG. 11, the user may be presented with a menu 1100 containing a collection of buttons including maintenance button 1106, diagnostic button 1108, and repair button 1110, among other buttons. Menu 1100 may also include a collision button (not shown).

As shown, menu 1100 includes a number of additional example buttons. Select-module button 1102 may collapse and/or expand the rest of menu 1100. Home button 1104 may cause the computing system to display the default, main, or "splash" window of graphical interface 700. Service-manual button 1112 may allow the user to access a virtual service manual for a vehicle based, at least in part on, the vehicular-reference data provided by the user. Vintage button 1114 may provide access to an external or integrated computing system and/or interface that provides access to a rich library of engine performance, wiring, chassis, and other repair information, including high-fidelity diagrams. Community button 1116 may provide access to an external or integrated social community such as a message board, message forum, social network or some combination thereof. Estimator button 1118 may provide access to an external or integrated computing system and/or interface that enables users to access cost estimation for given parts, procedures, and/or repairs, etc.

Figure 12:
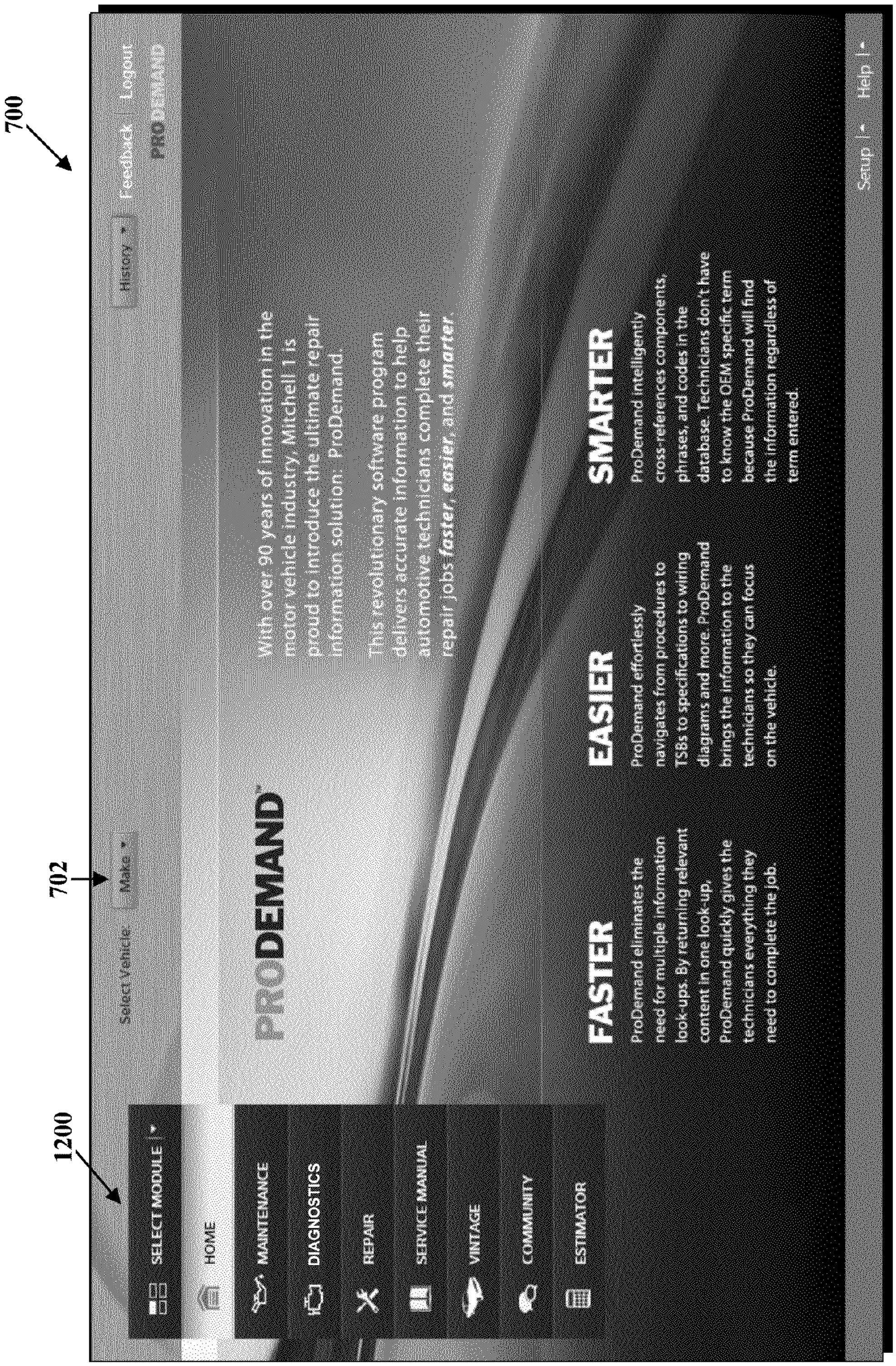
FIG. 12 shows an example graphical user interface including an example menu containing example information-presentation data input buttons.

For purposes of example and explanation, FIG. 12 again shows example graphical user interface 700 capable of receiving user inputs. As shown, graphical user interface 700 includes example menu 1200 containing a number of buttons for the user to choose from. The user may select any of the buttons, and thus provide the selected button as an information-presentation preference to server 106 as information-presentation data. It should be understood that the specific embodiment of an example graphical user interface as shown in FIG. 12 is set forth for purposes of example and explanation only, and should not be taken to be limiting.

b. Select First Piece of Vehicular-Reference Information

At block 404, the computing system selects at least one first piece of vehicular-reference information based on at least one of the received vehicular-reference data and the received first information-presentation data. As a general matter, the computing system may be capable of selecting a piece of vehicular-reference information based only on vehicular-reference data. However, first information-presentation data may be used instead, or to refine, the computing system's selection of vehicular-reference information.

The computing system may select the vehicular-reference information by reference to a database, such as database 314 discussed above, that stores information concerning the relationship between various vehicle parameters, information-presentation preferences, vehicular-reference information, and presentation windows. For instance, the computing system may select vehicular-reference information based on vehicular-reference information that is directly associated with the received vehicular-reference data and/or the received first information-presentation data. Alternatively, the computing system may be configured to infer that certain vehicular-reference information should be selected, and/or that certain vehicular-reference information should be prioritized over other vehicular-reference information, based on the received vehicular-reference data and/or the received first information-presentation data. Those of skill in the art will appreciate that vehicular-reference information may be selected in any suitable or desired manner.

The vehicular-reference information selected by the computing system may be at least one of (a) manufacturer's information, (b) experience-based information, and (c) miscellaneous information. Other types of vehicular-reference information may exist as well.

Manufacturer's information may include any information provided by the manufacturer of the vehicle that is under evaluation. Sources of manufacturer's information may include, for example, an owner manual, a maintenance manual, a diagnostic manual, a training manual, and/or a repair manual. Thus, when the vehicular-reference information is manufacturer's information, selecting the at least one first piece of vehicular-reference information may involve selecting one of (a) owner-manual information, (b) maintenance-manual information, (c) diagnostic-manual information, (d) training-manual information, and (e) repair-manual information.

Experience-based information may include any information regarding vehicles collected by users of the computing system and/or information that is collected and stored by the computing system based on the experience of users. Sources of experience-based information may include, for example, information input by users, information obtained by the computing system as a result of monitoring activity on and/or use of the computing system, and/or community-based information. Thus, when the vehicular-reference information is experience-based information, selecting the at least one first piece of vehicular-reference information may involve selecting one of (a) user-input information, (b) computing-system-monitoring information, and (c) community-based information.

User-input information may be, for example, vehicular-reference information affirmatively input to the computing system by a user at some point in the past (e.g., a tip for removing a given component). Computing-system-monitoring information may be, for example, vehicular-reference information inferred by the computing system after use by a variety of users (e.g., the computing system may recognize that users commonly require a certain type of information for a given vehicle that is under evaluation). Community-based information may be a formal and/or informal collection of vehicular-reference information generated by an on-line community of mechanics, technicians, other repair professionals, and/or hobbyists. For example, the community-based information may be taken from a discussion on a "bulletin board," whereby a sufficient amount of activity has been generated around the discussion, or a sufficient number of members of the community has indicated the discussion is of interest. As another example, the community-based information may be taken from a comment on a "social-network," or other social forum, whereby a sufficient amount of activity has been generated around the comment, or a sufficient number of members of the community have indicated the comment is of interest. In this way, the community-based information may be "crowd-sourced."

Miscellaneous information may include any other type of information from various other sources that may be relevant to the vehicle that is under evaluation. Sources of miscellaneous information may include, for example, recalls, history, prognostics, technical-service-bulletins (TSBs), and/or community alerts. Thus, when the vehicular-reference information is miscellaneous information, selecting the at least one first piece of vehicular-reference information may involve selecting one of (a) recall information, (b) history information, (c) prognostic information, (d) technical-service-bulletin (TSB) information, and (e) community-alert information.

Recall information may include information pertaining to the vehicle under evaluation, or a part thereof, that is defective or otherwise needs to be replaced and/or repaired. The recall information may include information such as the recall purpose which informs the user of the reason for the recall and why the recall is necessary; which component or components are subject to the recall and any potential problems related to the recall of each component; and the action required by the user to repair or replace the components including where to bring the vehicle, when the repair can be completed, and what alternate options are available for repairs.

History information may include any type of desirable historical information including, for example, a given shop or community's past experiences with a given type of vehicle under evaluation, a given shop or community's past experiences with a particular vehicle under evaluation, and/or a given shop or community's past experiences with a given component, etc.

Prognostic information may include any information used to infer, predict, or recommend desired actions based on symptoms or characteristics of the vehicle under evaluation. The prognostic information may be sourced from past users of the computing system itself and/or may be obtained from a third-party source.

TSB information may include information pertaining to the vehicle that is under evaluation, or a part thereof, that is defective or otherwise needs to be replaced and/or repaired. TSB information may be issued by a vehicle manufacturer when there are several occurrences of an unanticipated problem. TSB information may be widely circulated among vehicle service departments to provide engineering-level description and solution information for a problem common to type, year, make and/or model of vehicle.

Community-alert information may be a formal and/or informal collection of information generated by an on-line community of mechanics, technicians, other repair professionals, and/or hobbyists. For example, the community alert may be taken from a discussion on a "bulletin board," whereby a sufficient amount of activity has been generated around the discussion, or a sufficient number of members of the community have indicated the discussion is of interest. As another example, the community alert may be taken from a comment on a "social-network," or other social forum, whereby a sufficient amount of activity has been generated around the comment, or a sufficient number of members of the community have indicated the comment is of interest. In this way, the community alert may be "crowd-sourced."

c. Select Presentation Window

At block 406, the computing system selects a presentation window based on at least one of the received vehicular-reference data and the received first information-presentation data. As a general matter, the computing system may be capable of selecting a presentation window based only on first information-presentation data. However, vehicular-reference data may be used instead, or to refine, the computing system's selection of a presentation window.

The computing system may select the presentation window by reference to a database, such as database 314 discussed above, that stores information concerning the relationship between various vehicle parameters, information-presentation preferences, vehicular-reference information, and presentation windows. For instance, the computing system may select the presentation window based on a presentation window(s) that is directly associated with the received vehicular-reference data and/or the received first information-presentation data. Alternatively, the computing system may be configured to infer that a certain presentation window(s) should be selected, and/or that certain presentation window(s) should be prioritized over other presentation window(s), based on the received vehicular-reference data and/or the received first information-presentation data. Those of skill in the art will appreciate that presentation window(s) may be selected in any suitable or desired manner.

As noted above, the information-presentation preference may be one of (a) maintenance information, (b) repair information, (c) diagnostic information, or (d) collision information. Other types of information-presentation preferences may exist as well.

Below, certain windows are discussed as associated with given information-presentation preferences. Note that examples of such windows are discussed further below with respect to causing a visual depiction of the selected vehicular-reference information and presentation window to be displayed, in accordance with block 408.

As a general matter, a given information-presentation preference may be associated with a variety of displays, or windows, which are configured or otherwise arranged to present vehicular-reference information in a particular manner. For instance, the maintenance information-presentation preference may be associated with an interval window, a lifetime-services window, a locator window, a procedure window, and/or a maintenance-reminder-reset window. Thus, when the information-presentation preference is maintenance information, selecting the at least one presentation window may involve selecting one of (a) an interval window, (b) a lifetime-services window, (c) a locator window, (d) a procedure window, (e) a specification window, and (f) a maintenance-reminder-reset window. For example, when a user provides a maintenance information-presentation preference, the computing system may default to a display of the interval window. Alternatively, the computing system may default to a display of any of the other windows associated with the maintenance information-presentation preference.

Further, the computing system may be configured to receive additional information-presentation data input by the user indicating one of the windows associated with the maintenance information-presentation preference. For instance, after displaying a default window associated with the maintenance information-presentation preference, the user may provide an additional input indicating that the user would like to navigate to one of the other windows associated with the maintenance information-presentation preference. Thus, the computing system may receive second information-presentation data indicating one of (a) the interval window, (b) the lifetime-services window, (c) the locator window, (d) the procedure window, (e) the specification window, and (f) the maintenance-reminder-reset window. And the computing system may select the at least one presentation window based on at least the received second information-presentation data.

The repair information-presentation preference may be associated with a description window, a locator window, a procedures window, a diagram window, and/or a specification window. Thus, when the information preference is repair information, selecting the at least one presentation window may involve selecting one of (a) a description window, (b) a locator window, (c) a procedures window, (d) a diagram window, and (e) a specification window. For example, when a user provides a repair information-presentation preference, the computing system may default to a display of the description window. Alternatively, the computing system may default to a display of any of the other windows associated with the repair information-presentation preference.

Further, the computing system may be configured to receive additional information-presentation data input by the user indicating one of the windows associated with the repair information-presentation preference. For instance, after displaying a default window associated with the repair information-presentation preference, the user may provide an additional input indicating that the user would like to navigate to one of the other windows associated with the repair information-presentation preference. Thus, the computing system may receive second information-presentation data indicating one of (a) a description window, (b) a locator window, (c) a procedures window, (d) a diagram window, and (e) a specification window. And the computing system may select the at least one presentation window based on at least the received second information-presentation data.

The diagnostic information-presentation preference may be associated with a description window, a diagram window, a connector-view window, a locator window, a testing window, a procedures window, a specification window, and/or a history window. Thus, when the information preference is diagnostic information, selecting the at least one presentation window may involve selecting one of (a) a description window, (b) a diagram window, (c) a connector-view window, (d) a locator window, (e) a testing window, (f) a procedures window, (g) a specification window, and (h) a history window. For example, when a user provides a diagnostic information-presentation preference, the computing system may default to a display of the description window. Alternatively, the computing system may default to a display of any of the other windows associated with the diagnostic information-presentation preference.

Further, the computing system may be configured to receive additional information-presentation data input by the user indicating one of the windows associated with the diagnostic information-presentation preference. For instance, after displaying a default window associated with the diagnostic information-presentation preference, the user may provide an additional input indicating that the user would like to navigate to one of the other windows associated with the diagnostic information-presentation preference. Thus, the computing system may receive second information-presentation data indicating one of (a) the description window, (b) the diagram window, (c) the connector-view window, (d) a locator window, (e) the testing window, (f) the procedures window, (g) the specification window, and (h) the history window. And the computing system may select the at least one presentation window based on at least the received second information-presentation data.

d. Cause Visual Depiction of Selected Vehicular-Reference Information and Presentation Window to be Displayed At block 408, the computing system causes a visual depiction of (i) the selected vehicular-reference information and (ii) the selected presentation window to be displayed on a graphical display. The display of the selected vehicular-reference information and the selected presentation window may, generally, be any display that suitably indicates the vehicular-reference information (e.g., within the selected presentation window) to the user, and that enables the user to evaluate the selected vehicular-reference information. Server 106 may enable the user to navigate, browse, or otherwise manipulate the selected vehicular-reference information. In this way, the user may, if desired, further manipulate, or refine, the display of the selected vehicular-reference information so as to more particularly suit the user's needs and/or preferences.

Figure 13:
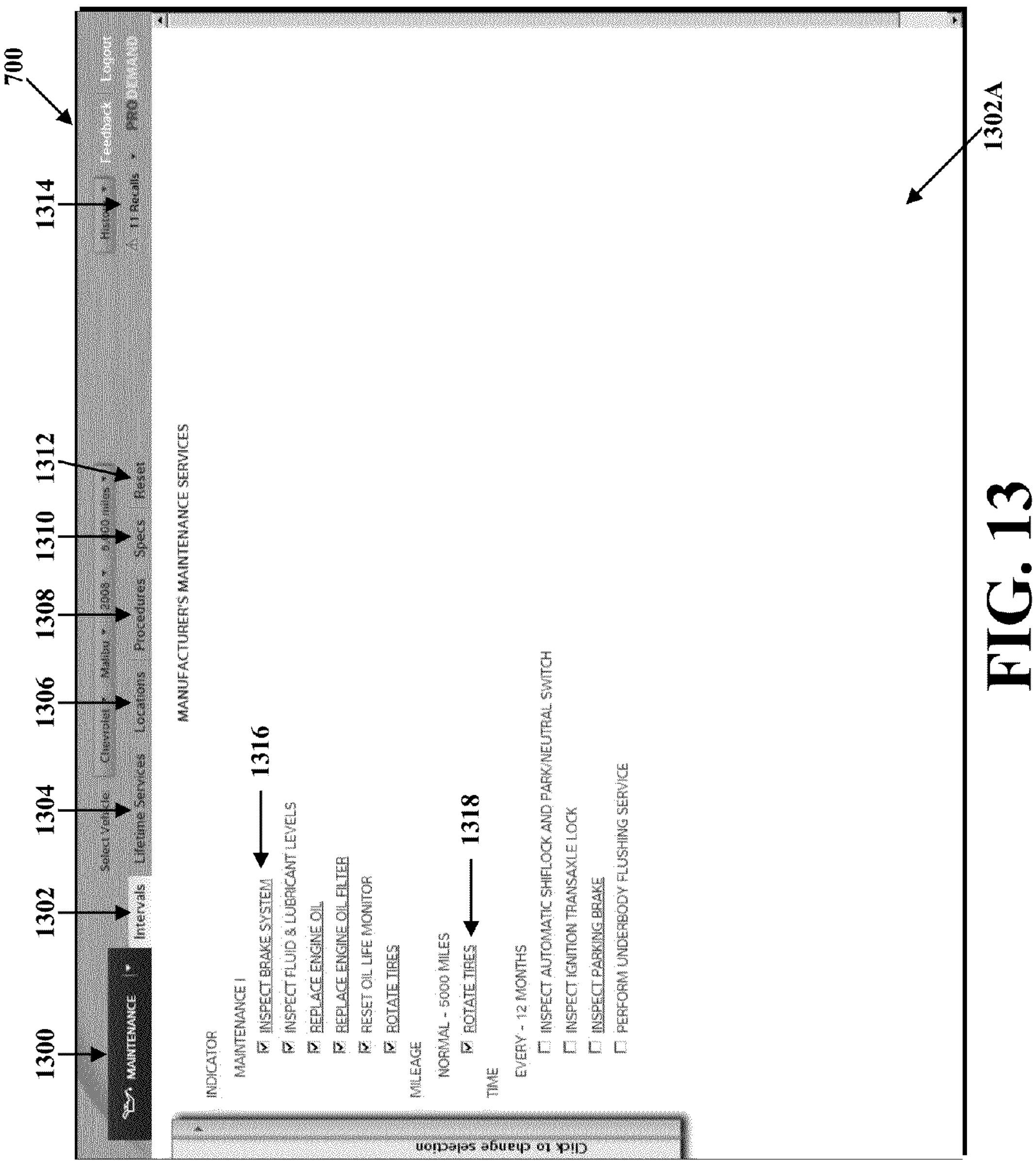
FIG. 13 shows an example interval window.

FIG. 13 shows an example interval window that has been selected and displayed based on received information-presentation data that indicates a maintenance information-presentation preference and/or information-presentation data indicating the interval window. As shown, graphical user interface 700 includes a maintenance indicator 1300 that indicates the maintenance information-presentation preference. Maintenance indicator 1300 may also be a clickable button that, when clicked, expands to make accessible a menu of other information-presentation preferences, as discussed above with respect to menu 1200 of FIG. 12.

Graphical user interface 700 also includes interval tab 1302 and interval window 1302A. Further, additional tabs, including lifetime-services tab 1304, locations tab 1306, procedures tab 1308, specs tab 1310, and reset tab 1312, each corresponding, respectively, to the lifetime-services window, the locator window, the procedure window, the specification window, and the maintenance-reminder-reset window described above (not currently displayed). Graphical user interface 700 also includes recall tab 1314, discussed further below with respect to FIG. 16. Each tab 1304-1314 may be a clickable button that, when clicked, causes the respective window corresponding to the tab to be displayed in graphical user interface 700.

Interval window 1302A includes, for example, a display of vehicular-reference information which, in this case, includes a variety of maintenance tasks that should be performed on the vehicle that is under evaluation given the year, make, model, and mileage vehicle parameters previously provided by the user. Some such tasks may be clickable buttons that, when clicked, cause instructions or other additional information regarding each task to be displayed. For example "inspect brake system" button 1316 may be clickable, causing step-by-step instructions for inspecting the brake system to be displayed. As another example, "rotate tires" button 1318 may be clickable, causing step-by-step instructions for rotating tires to be displayed. Other examples may exist as well.

Figure 14:
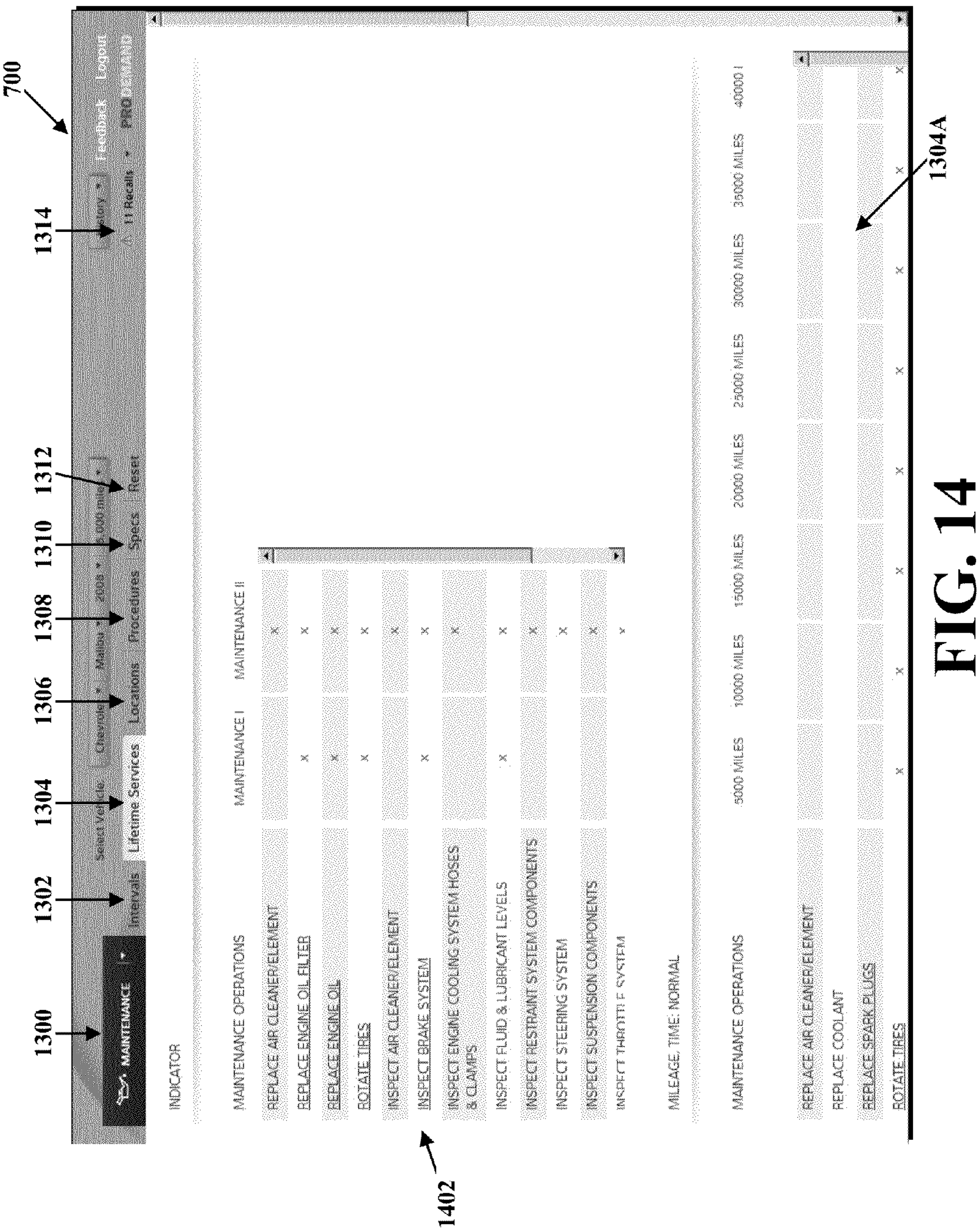
FIG. 14 shows an example lifetime-services window.

FIG. 14 shows an example lifetime-services window that has been selected and displayed based on received information-presentation data that indicates a maintenance information-presentation preference and/or information presentation data indicating the lifetime-services window. Graphical user interface 700 includes lifetime-services tab 1304 and lifetime-services window 1304A. Interval window 1304A includes, for example, a display of vehicular-reference information which, in this case, includes various maintenance operations that may be performed on the vehicle under evaluation. Some such operations may be clickable buttons that, when clicked, cause instructions or other additional information regarding each operation to be displayed. For example "inspect brake system" button 1402 may be clickable, causing step-by-step instructions for inspecting the brake system to be displayed.

Figure 15:
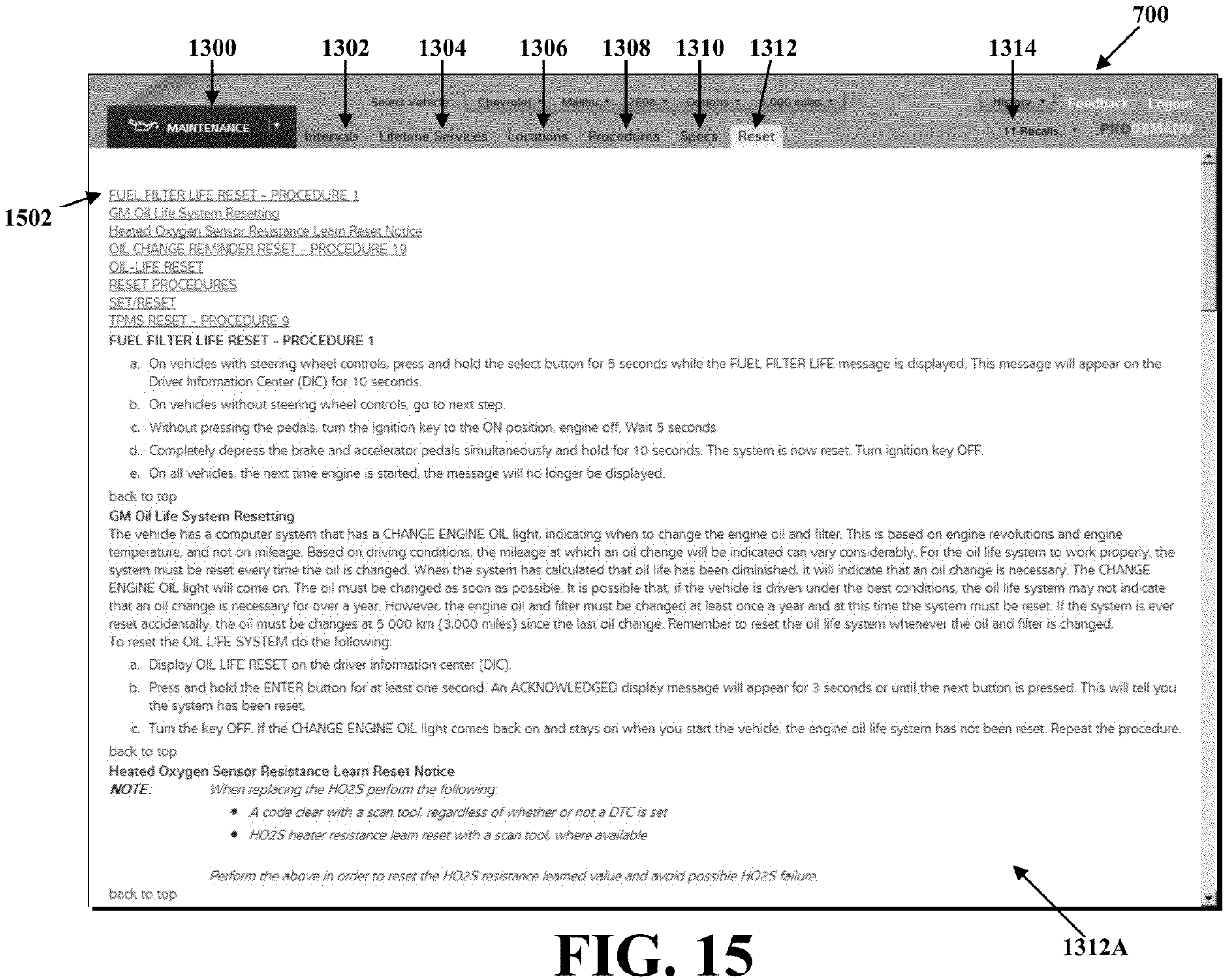
FIG. 15 shows an example maintenance-reminder-reset window.

FIG. 15 shows an example maintenance-reminder-reset window that has been selected and displayed based on received information-presentation data that indicates a maintenance information-presentation preference and/or information presentation data indicating the maintenance-reminder-reset window. Graphical user interface 700 includes reset tab 1312 and maintenance-reminder-reset window 1312A. Maintenance-reminder-reset window 1312A includes, for example, a display of vehicular-reference information which, in this case, includes various reset procedures that may be performed on the vehicle under evaluation. Some such procedures may be clickable buttons that, when clicked, cause instructions or other additional information regarding each procedure to be displayed. For example "FUEL FILTER LIFE RESET-PROCEDURE 1" button 1502 may be clickable, causing step-by-step instructions for resetting the fuel filter life to be displayed.

Figure 16:
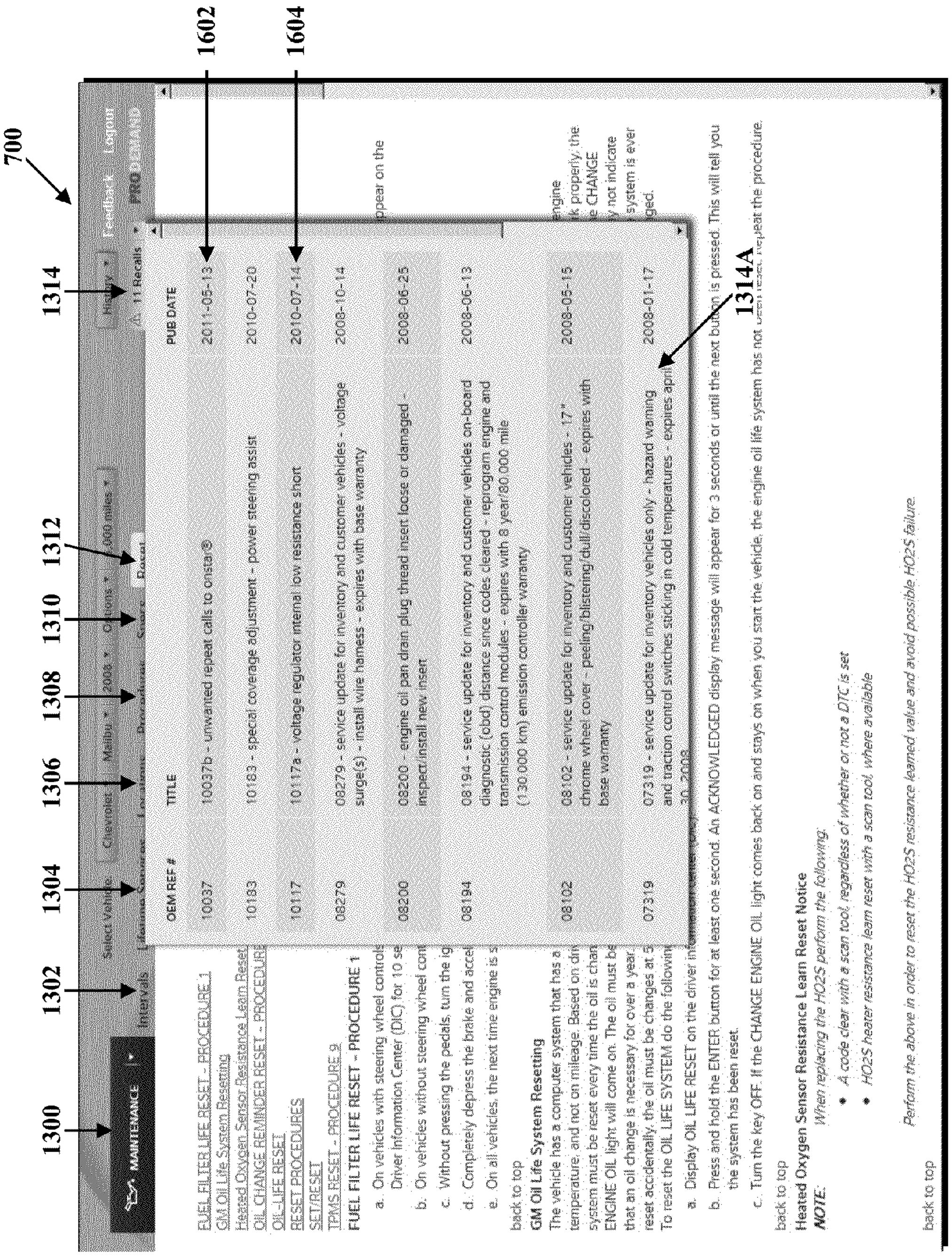
FIG. 16 shows an example recall-information menu.

FIG. 16 shows an example recall-information menu that has been selected and displayed based on received information presentation data that indicates a maintenance information-presentation preference and/or information presentation data indicating the recall menu. Graphical user interface 700 includes recall tab 1314 and recall menu 1314A. Recall menu 1314A includes, for example, a display of vehicular-reference information which, in this case, includes various recall information (including, for example an original equipment manufacturer (OEM) reference number, title, and publication date of the recall) that may be relevant to the vehicle that is under evaluation, or parts thereof. For example, recall menu 1314A includes recall information 1602, having an OEM reference number of "10037," a title of "10037b—unwanted repeat calls to Onstar®," and a publication date of "2011-05-13." As another example, recall menu 1314A includes recall information 1604, having OEM reference number "10117," a title of "10117a—voltage regulator internal low resistance short," and a publication date of "2010-07-14."

The aggregation, presentation, and easy accessibility of such recall information advantageously provides a convenient manner of accessing recall information at substantially the same time as performing any other evaluation, procedure, and/or operation on the vehicle under evaluation. Recall information is discussed further below.

Figure 17:
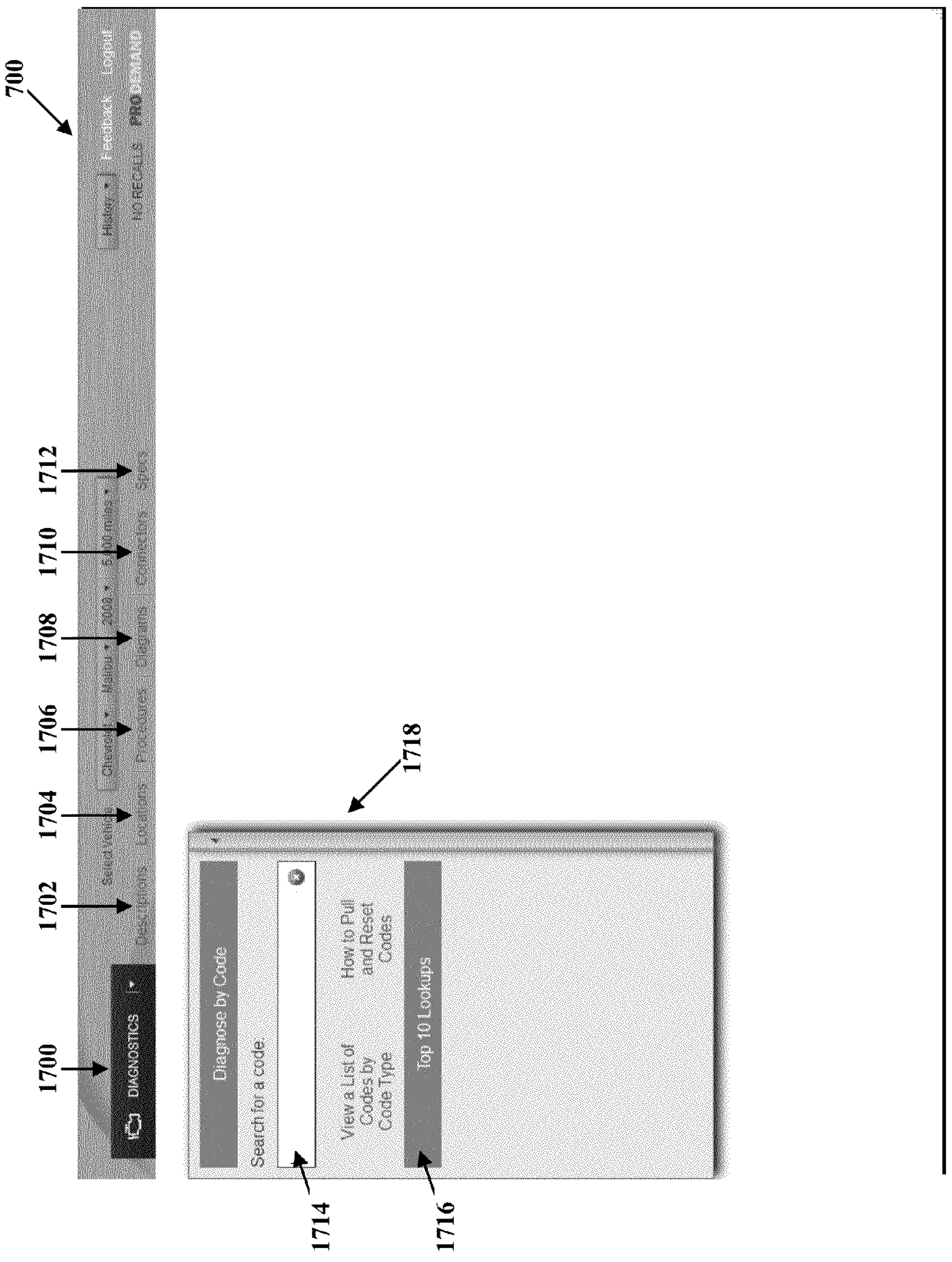
FIG. 17 shows an example diagnostic window.

FIG. 17 shows an example diagnostic window that has been selected and displayed based on received information-presentation data that indicates a diagnostic information-presentation preference. As shown, graphical user interface 700 includes a diagnostics indicator 1700 that indicates the diagnostic information-presentation preference. Diagnostics indicator 1700 may also be a clickable button that, when clicked, expands to make accessible a menu of other information-presentation preferences, as discussed above with respect to menu 1200 of FIG. 12.

Graphical user interface 700 also includes a diagnostic-trouble-code (DTC) menu 1718. A DTC is a code prescribed by the Society of Automotive Engineers (SAE) to help track problems in a vehicle detected by its on-board computer (such as the ECM). DTC menu 1718 includes a DTC input field 1714, whereby a user may input a DTC and search for vehicular-reference information related to the input DTC. Further, DTC menu 1718 includes a "Top 10" button 1716 which, when clicked, may bring up the top-ten most accessed DTCs. Note that the DTC may be supplied, either directly or as a result of being read by the user, by an ECM of the vehicle that is under evaluation.

Further, the diagnostic window may include tabs including descriptions tab 1702, locations tab 1704, procedures tab 1706, diagrams tab 1708, connectors tab 1710, and specifications tab 1712, each corresponding respectively to the description window, the locator window, the procedure window, the diagram window, the connector-view window, and the specifications window described above. In another embodiment, the diagnostic window may also include a testing tab and a history tab (not shown), each corresponding respectively to the testing window and the history window described above. Each tab 1702-1712 may be a clickable button that, when clicked, causes the respective window associated with the tab to be displayed in graphical user interface 700.

Figure 18:
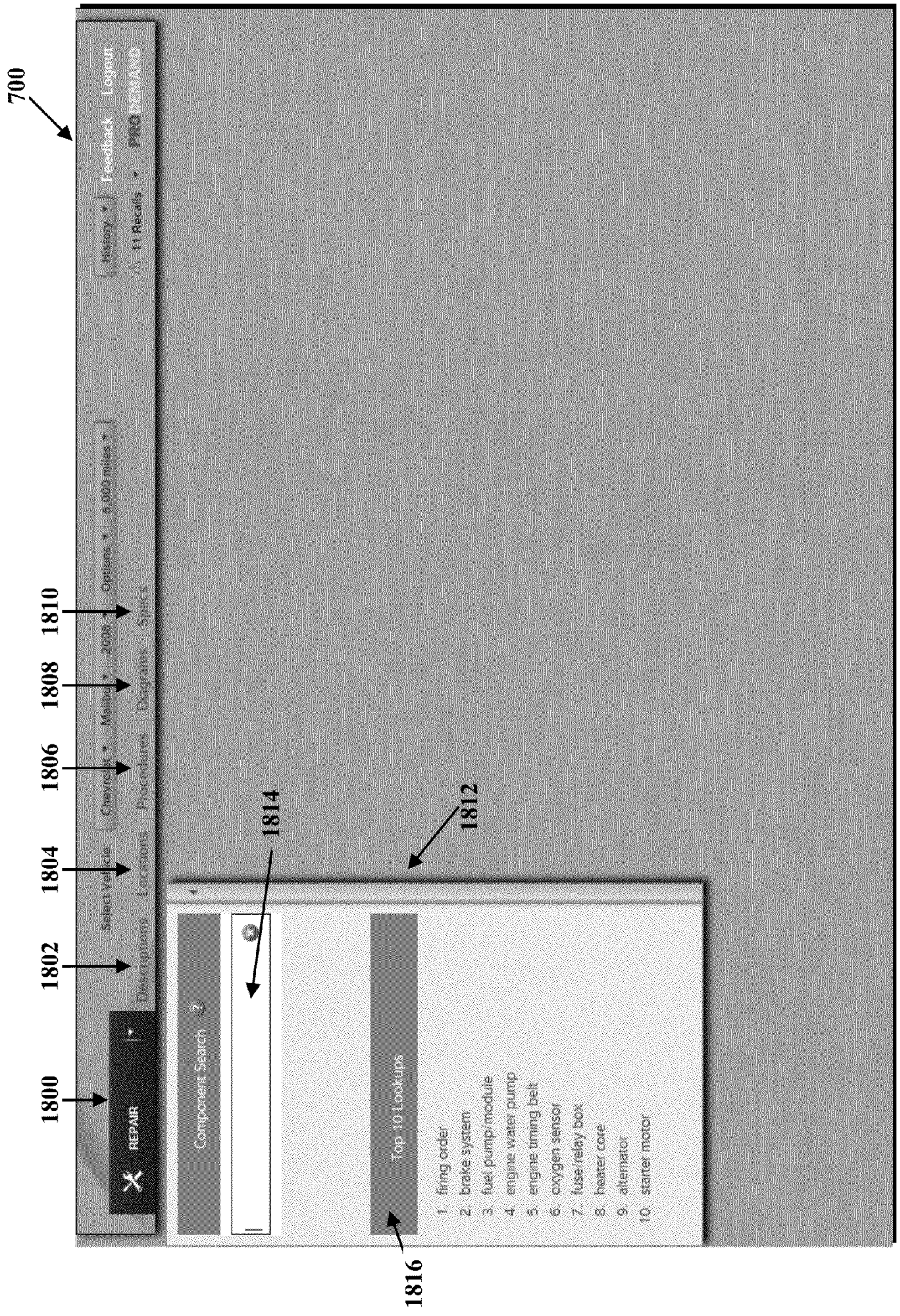
FIG. 18 shows an example repair window.

FIG. 18 shows an example repair window that has been selected and displayed based on received information-presentation data that indicates a repair information-presentation preference. As shown, graphical user interface 700 includes a repair indicator 1800 that indicates the repair information-presentation preference. Repair indicator 1800 may also be a clickable button that, when clicked, expands to make accessible a menu of other information-preferences, as discussed above with respect to menu 1200 of FIG. 12.

Graphical user interface 700 also includes a component-search menu 1812. Component-search menu 1812 includes a component input field 1814, whereby a user may input a component and search for vehicular-reference information related to the input component. Further, component-search menu 1812 includes a "Top 10" button 1816 which, when clicked, may bring up the top-ten most accessed components.

Further, the repair window may include tabs including descriptions tab 1802, locations tab 1804, procedures tab 1806, diagrams tab 1808, and specifications tab 1810, each corresponding respectively to the description window, the locator window, the procedures window, the diagram window, and the specification window described above. Each tab 1802-1810 may be a clickable button that, when clicked, causes the respective window to be displayed in graphical user interface 700.

Thus, after the computing system receives the vehicular-reference data indicating at least one vehicle parameter, the computing system may receive, via the user interface (e.g., component input field 1814), a search term. The computing system may then select at least one second piece of vehicular-reference information based on at least the received search term. And the computing system may cause a visual depiction of the at least one second piece of vehicular-reference information to be displayed on the graphical display.

Figure 19:
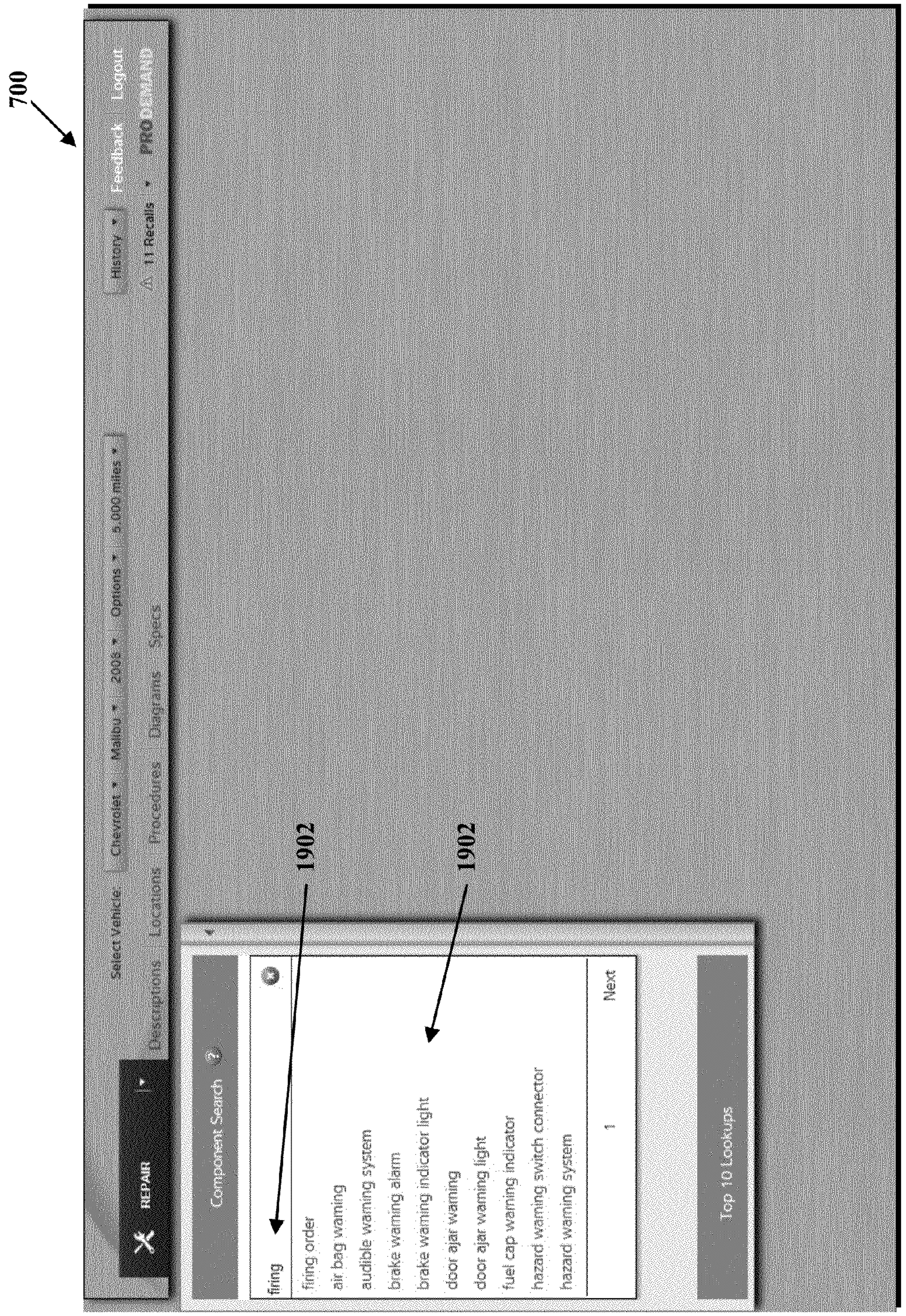
FIG. 19 shows an example component-search term and search results.

For instance, with reference to FIG. 19, the user may input the component-search term “firing” 1902 into the component input field. Upon doing so, the computing system may return a number of vehicular-reference information types involving “firing,” as indicated by menu 1902 “firing order,” “air bag warning,” “audible warning system,” etc. Each vehicular-reference information type may also be a clickable button that, when clicked, causes associated vehicular-reference information to be displayed.

Also note that the component-search term entered into the component input field may not represent a single component. For instance, the component-search term may reflect a system or sub-system that includes multiple components. Upon receiving such a multiple-component search term, the computing system may return vehicle-reference information that involves a number of topics related to the multiple-component search term. As one example, the user may enter a multiple-component search term such as “brakes.” In response, the computing system may return, within a single search “result,” a variety of brake-related vehicular-reference information such as repair information, replacement information, and/or other information potentially of interest such as wheel-alignment information.

Thus, as discussed above, the computing system may maintain a vehicular-reference-information database, such as database 314, including vehicular-reference-information-type data for the vehicular-reference information, wherein the vehicular-reference-information-type data for a given one of the vehicular-reference information specifies one or more vehicular-reference-information types associated with the given vehicular-reference information. Further, the computing system may cause a visual indication that the at least one second piece of vehicular-reference information (e.g., vehicular-reference information associated with “firing order”) is of the one or more vehicular-reference-information types (e.g., “firing order”) associated with the at least one second piece of vehicular-reference information.

Figure 20:
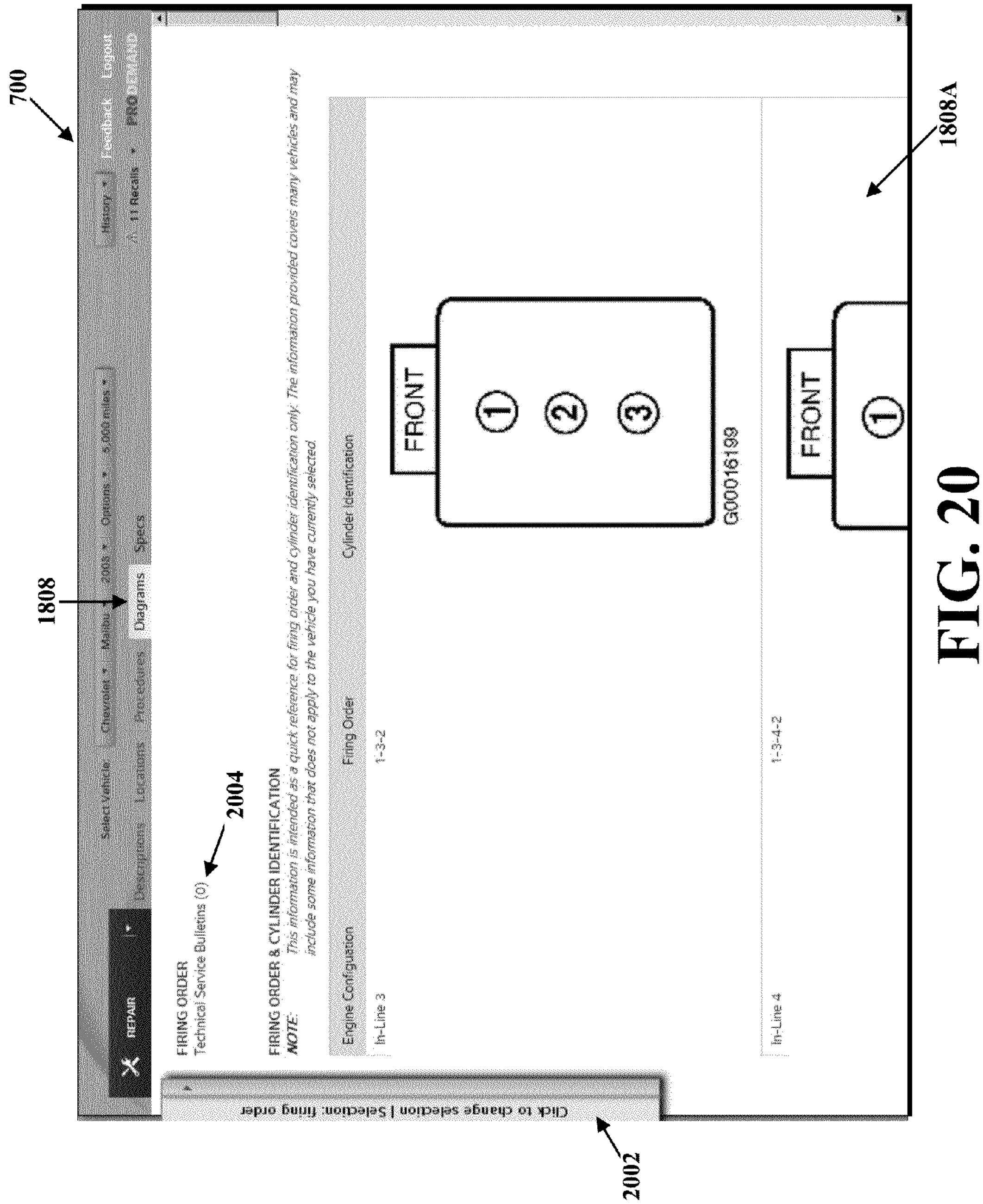
FIG. 20 shows an example diagrams window.

With reference to FIG. 20, for example, upon clicking “firing order,” or searching on the term “firing order,” diagrams tab 1808 is activated and diagrams window 1808A is displayed. Diagrams window 1808A contains vehicular-reference information related to “Firing Order” for the vehicle under evaluation.

Thus, selecting the at least one second piece of vehicular-reference information based on at least the received search term (e.g. “firing order”) may involve selecting the at least one second piece of vehicular-reference information based on at least (a) the received search term (e.g., firing order) and (b) the at least one vehicle parameter (e.g., the make, model, year, and/or the mileage of the vehicle under evaluation).

Note that menu bar 2002 is also present in graphical user interface 700. Menu bar 2002 may be a clickable button that, when clicked, expands into component-search menu 1812 described above with respect to FIG. 18. In this way, the user may then execute an additional component search at any time. Note also that TSB notification 2004 is also present in diagrams window 1808A. As shown, TSB notification 2004 indicates that no TSBs are available with respect to “Firing Order” for the vehicle that is currently under evaluation. However, in other instances, a TSB may be available and TSB notification 2004 may be a clickable button that, when clicked, causes the computing system to display vehicular-reference information related to a TSB.

e. Additional Functions

Server 106 may be configured to carry out various functions in addition to those functions described with respect to FIG. 4. Examples of such additional functions are described below.

As one example, the computing system may be configured or otherwise arranged to, based on at least the received vehicular-reference data, select at least one alert, wherein the alert is one of (a) a recall alert, (b) a technical-service-bulletin (TSB) alert, and (c) a community-dialog alert. And the computing system may also cause a visual depiction of the at least one selected alert to be displayed on the graphical display.

A recall alert may include information pertaining to the vehicle under evaluation, or a part thereof, that is defective or otherwise needs to be replaced and/or repaired. The recall alert may include information such as the recall purpose which informs the user of the reason for the recall and why the recall is necessary; which component or components are subject to the recall and any potential problems related to the recall of each component; and the action required by the user to repair or replace the components including where to bring the vehicle, when the repair can be completed, and what alternate options are available for repairs.

A TSB alert may also include information pertaining to the vehicle under evaluation, or a part thereof, that is defective or otherwise needs to be replaced and/or repaired. A TSB alert may differ from a recall alert in that TSB alerts may be issued by a vehicle manufacturer when there are several occurrences of an unanticipated problem. While a recall alert may evolve out of safety issues at the behest of a federal safety organization, a TSB alert may be widely circulated among vehicle service departments to provide engineering-level description and solution information for a problem common to type, year, make and/or model of vehicle.

A community-dialog alert may also include information pertaining to the vehicle under evaluation, or a part thereof, that is defective or otherwise needs to be replaced and/or repaired. A community-dialog alert may differ from a recall alert and a TSB alert in that its source may be a formal and/or informal collection of information generated by an on-line community of mechanics, technicians, other repair professionals, and/or hobbyists. For example, the community-dialog alert may be taken from a discussion on a “bulletin board,” whereby a sufficient amount of activity has been generated around the discussion, or a sufficient number of members of the community have indicated the discussion is of interest. As another example, the community-dialog alert may be taken from a comment on a “social-network,” or other social forum, whereby a sufficient amount of activity has been generated around the comment, or a sufficient number of members of the community have indicated the comment is of interest. In this way, the alerts potentially communicated to the user may be “crowd-sourced” and not necessarily limited to more traditional sources such as recall alerts and/or TSB alerts.

The visual depiction of the at least one selected alert may be displayed within the selected presentation window. For instance, upon selecting a maintenance-reminder-reset window based on received information-presentation data that indicates a maintenance information-presentation preference and/or information presentation data indicating the maintenance-reminder-reset window, the computing system may automatically display the selected alert upon displaying the maintenance-reminder-reset window. In this way, the user will be automatically made aware of the existence of an alert of potential interest. Alternatively, the visual indication of the existence of an alert, such as recall button 1314 described above with respect to FIG. 16, may be provided. The user may then click recall button 1314 to access recall information via menu 1314A as also discussed above with respect to FIG. 16.

The computing system may also provide an audible indication of the at least one selected alert. The audible indication of the at least one selected alert may be played by a speaker coupled to a network access device. Such an audible indication may be any tone, ring, statement of the alert, and/or any other suitable audible indication that may be perceived by the user.

III. CONCLUSION

Note that while examples have been described in conjunction with present embodiments of the application, persons of skill in the art will appreciate that variations may be made without departure from the scope and spirit of the application. For example, the apparatus and methods described herein may be implemented in hardware, software, or a combination thereof, such as a general purpose or dedicated processor running a software application through volatile or non-volatile memory in order to transform the general purpose computer or dedicated processor into a unique special purpose processor. The true scope and spirit of the application is defined by the appended claims, which may be interpreted in light of the foregoing.

I claim:

1. A method comprising:

storing, at a non-transitory computer-readable medium, a database, wherein the database includes a plurality of presentation preferences for displaying vehicular reference information on remote displays, each presentation preference representing a unique group of multiple associated display window identifiers, each display window identifier pertaining to a particular type of vehicular reference information stored within the database, and wherein the plurality of presentation preferences includes a first presentation preference selected from among a diagnostics information presentation preference, a repair information presentation preference, and a maintenance information presentation preference;

receiving, by at least one processor coupled to the computer-readable medium, (i) a vehicle parameter indicating at least a year, make, and model of a vehicle-under-evaluation, and (ii) data from a first remote display indicating selection of the first presentation preference, wherein at least a portion of the vehicle parameter is received from the vehicle-under-evaluation;

selecting, by the at least one processor from the database, vehicular reference information for populating, at the first remote display, respective display windows associated with each display window identifier of the unique group of multiple associated display window identifiers represented by the first presentation preference, wherein the selected vehicular reference information pertains to vehicles of a particular year, make, and model matching the year, make, and model of the vehicle-under-evaluation indicated by the vehicle parameter;

selecting, by the at least one processor, a first display window associated with both a first portion of the selected vehicular reference information and the first presentation preference; and communicating, over a communication network to the first remote display by a communication interface coupled to the at least one processor, the selected vehicular reference information for displaying the first portion of the selected vehicular reference information in the selected first display window on the first remote display before displaying any other portion of the selected vehicular reference information in another display window associated with a display window identifier of the unique group of multiple associated display window identifiers represented by the first presentation preference.

2. The method of claim 1, wherein the vehicle parameter further indicates at least one of (a) a vehicle engine of the vehicle-under-evaluation, (b) a vehicle mileage of the vehicle-under-evaluation, (c) a vehicle component of the vehicle-under-evaluation, (d) a vehicle identification number (VIN) of the vehicle-under-evaluation, (e) a vehicle unit number of the vehicle-under-evaluation, (f) a vehicle error code of the vehicle-under-evaluation, and (g) a vehicle symptom of the vehicle-under-evaluation.

3. The method of claim 1, wherein the first presentation preference is the repair information presentation preference, and wherein the first display window comprises one of (a) a description window, (b) a locator window, (c) a procedures window, (d) a diagram window, and (e) a specification window.

4. The method of claim 1, wherein the first presentation preference is the diagnostic information presentation preference, and wherein the first display window comprises one of (a) a description window, (b) a diagram window, (c) a connector-view window, (d) a locator window, (e) a testing window, (f) a procedures window, (g) a specification window, and (h) a history window.

5. The method of claim 1, wherein the particular type of vehicular reference information comprises at least one of (a) manufacturer's information and (b) miscellaneous information.

6. The method of claim 1, wherein the particular type of vehicular reference information comprises manufacturer's information, and wherein selecting the first portion of the selected vehicular reference information comprises selecting one of (a) owner-manual information, (b) maintenance information, (c) diagnostic information, (d) training information, and (e) repair information.

7. The method of claim 1, wherein selecting the vehicular reference information comprises selecting one of (a) user-input information, (b) computing-system-monitoring information, and (c) community-based information.

8. The method of claim 5, wherein the first portion of the selected vehicular reference information comprises one of (a) recall information, (b) history information, (c) prognostic information, (d) technical-service-bulletin (TSB) information, and (e) community-alert information.

9. The method of claim 1, wherein the selected vehicular reference information comprises an alert selected from the group consisting of (a) a recall alert, (b) a technical-service-bulletin (TSB) alert, and (c) a community-dialog alert.

10. The method of claim 9, wherein the first portion of the selected vehicular reference information comprises selected alert.

11. A non-transitory computer readable medium containing:

a database, wherein the database includes a plurality of presentation preferences for displaying vehicular reference information on remote displays, each presentation preference representing a unique group of multiple associated display window identifiers, each display window identifier pertaining to a particular type of vehicular reference information stored within the database, and wherein the plurality of presentation preferences includes a first presentation preference selected from among a diagnostics information presentation preference, a repair information presentation preference, and a maintenance information presentation preference; and program instructions that when executed by at least one processor coupled to the computer-readable medium cause the following functions to be performed:

receiving, by the at least one processor, (i) a vehicle parameter indicating at least a year, make, and model of a vehicle-under-evaluation, and (ii) data indicating selection of the first presentation preference, wherein at least a portion of the vehicle parameter is received from the vehicle-under-evaluation;

selecting, by the at least one processor from the database, vehicular reference information for populating, at the first remote display, respective display windows associated with each display window identifier of the unique group of multiple associated display window identifiers represented by the first presentation preference, wherein the selected vehicular reference information pertains to vehicles of a particular year, make, and model matching the year, make, and model of the vehicle-under-evaluation indicated by the vehicle parameter;

selecting, by the at least one processor, a first display window associated with both a first portion of the selected vehicular reference information and the first presentation preference; and communicating, over a communication network to the first remote display by a communication interface coupled to the at least one processor, the selected vehicular reference information for displaying the first portion of the selected vehicular reference information in the selected first display window on a display before displaying any other portion of the selected vehicular reference information in another display window associated with a display window identifier of the unique group of multiple associated display window identifiers represented by the first presentation preference.

12. The non-transitory computer readable medium of claim 11, wherein the selected vehicular reference information comprises an alert selected from the group consisting of (a) a recall alert, (b) a technical-service-bulletin (TSB) alert, and (c) a community-dialog alert.

13. A computing system comprising:

a processor;

a user interface connected to the processor;

a graphical display connected to the processor;

a vehicle interface for connecting the computing system to a vehicle-under-evaluation;

a communication interface connected to the processor; and non-transitory data storage comprising program instructions executable by the processor for causing the computing system to carry out functions including:

displaying, by the graphical display, a plurality of presentation preferences for displaying vehicular reference information, each presentation preference representing a unique group of multiple associated display window identifiers, each display window identifier pertaining to a particular type of vehicular reference information stored within a database, and wherein the plurality of presentation preferences includes a first presentation preference selected from among a diagnostics information presentation preference, a repair information presentation preference, and a maintenance information presentation preference;

receiving, by the processor from the vehicle interface, at least a portion of a vehicle parameter from the vehicle-under-evaluation connected to the vehicle interface, wherein the vehicle parameter indicates at least a year, make, and model of the vehicle-under-evaluation;

receiving, by the processor via the user interface, data indicating selection of the first presentation preference;

transmitting, by the communication interface over a network, the vehicle parameter and the data indicating selection of the first presentation preference;

receiving, by the communication interface over the network, vehicular reference information for populating, at the graphical display, respective display windows associated with each display window identifier of the unique group of multiple associated display window identifiers represented by the first presentation preference, wherein the selected vehicular reference information pertains to vehicles of a particular year, make, and model matching the year, make, and model of the vehicle-under-evaluation indicated by the vehicle parameter; and displaying, at the graphical display, the first portion of the selected vehicular reference information in the selected first display window before displaying any other portion of the selected vehicular reference information in another display window associated with a display window identifier of the unique group of multiple associated display window identifiers represented by the first presentation preference.

14. The computing system of claim 13, wherein the selected vehicular reference information comprises an alert selected from the group consisting of (a) a recall alert, (b) a technical-service-bulletin (TSB) alert, and (c) a community-dialog alert.

15. The method of claim 1, wherein the vehicle parameter further indicates a state of the vehicle-under-evaluation, and wherein the state of the vehicle-under-evaluation is selected from the group consisting of a vehicle mileage, a vehicle error code, and a vehicle symptom.

16. The method of claim 1, wherein one display window identifier of each unique group is defined as a default display window identifier, and wherein selecting the first display window includes displaying a display window associated with the default display window identifier of the unique group of multiple associated display window identifiers represented by the first presentation preference.

17. The computing system of claim 13, further comprising:

a wired or wireless connection to a vehicle interface connectable to the vehicle-under-evaluation, wherein the computing system receives at least a portion of the vehicle parameter from the vehicle-under-evaluation via the wired or wireless connection to the vehicle interface.

18. The non-transitory computer-readable medium of claim 11, wherein the computer-readable medium comprises a first non-transitory computer-readable medium containing the database, and a second non-transitory computer-readable medium containing the program instructions, and wherein first non-transitory computer-readable medium is separate from the second non-transitory computer-readable medium.

19. The method of claim 1, wherein the first presentation preference is the maintenance information presentation preference, and wherein the first display window comprises one of (a) an interval window, (b) a lifetime-services window, (c) a locator window, (d) a procedure window, (e) a specification window, and (f) a maintenance-reminder-reset window.

20. The method of claim 19, wherein the vehicle parameter further indicates an odometer reading for the vehicle-under-evaluation.

21. The computing system of claim 13, wherein the vehicle interface is configured to connect the computing system to the vehicle-under-evaluation by a wireless connection.

22. The computing system of claim 13, wherein the vehicle interface is configured to connect the computing system to the vehicle-under-evaluation by a wired connection.

23. The method of claim 4, wherein the vehicle parameter further indicates an diagnostic trouble code detected within the vehicle-under-evaluation.

24. The computing system of claim 13, wherein the first presentation preference is the repair information presentation preference, and wherein the first display window comprises one of (a) a description window, (b) a locator window, (c) a procedures window, (d) a diagram window, and (e) a specification window.

25. The computing system of claim 13, wherein the first presentation preference is the diagnostic information presentation preference, and wherein the first display window comprises one of (a) a description window, (b) a diagram window, (c) a connector-view window, (d) a locator window, (e) a testing window, (f) a procedures window, (g) a specification window, and (h) a history window.

26. The computing system of claim 13, wherein the first presentation preference is the maintenance information presentation preference, and wherein the first display window comprises one of (a) an interval window, (b) a lifetime-services window, (c) a locator window, (d) a procedure window, (e) a specification window, and (f) a maintenance-reminder-reset window.

* * * * *